United States Patent
Swinburne et al.

(10) Patent No.: US 12,332,397 B2
(45) Date of Patent: Jun. 17, 2025

(54) SYSTEMS AND METHODS FOR ENHANCING DATA ACQUISITION OPERATIONS IN SEISMIC SURVEYS

(71) Applicant: Schlumberger Technology Corporation, Sugar Land, TX (US)

(72) Inventors: Peter R Swinburne, Houston, TX (US); Robert van Kuijk, Clamart (FR); Eshan Chittimalla, Sugar Land, TX (US); Fadhel Rezgui, Bievres (FR); Hikmet Andic, Clamart (FR); Erik Emilio Hornil Espinoza, Clamart (FR); Alexey Masyukov, Clamart (FR); Nicolas Roumilly, Clamart (FR); Gatien Fangwa Tikanwou, Clamart (FR); Peter John Airey, Saint Germain Laval (FR); Olivier Condat, Clamart (FR); Upendra Rao Vedullapalli, Le Plessis-Robinson (FR); Gamanuel Dalmas, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 255 days.

(21) Appl. No.: 17/908,729

(22) PCT Filed: Mar. 1, 2021

(86) PCT No.: PCT/US2021/020236
§ 371 (c)(1),
(2) Date: Sep. 1, 2022

(87) PCT Pub. No.: WO2021/178286
PCT Pub. Date: Sep. 10, 2021

(65) Prior Publication Data
US 2023/0127346 A1    Apr. 27, 2023

Related U.S. Application Data

(60) Provisional application No. 62/987,764, filed on Mar. 10, 2020, provisional application No. 62/987,200, (Continued)

(51) Int. Cl.
*G01V 1/26* (2006.01)

(52) U.S. Cl.
CPC ............ *G01V 1/26* (2013.01); *G01V 2200/12* (2013.01)

(58) Field of Classification Search
None
See application file for complete search history.

(56) References Cited

U.S. PATENT DOCUMENTS 8,994,953 B2 * 3/2015 Crickmore ............... G01V 1/16
356/478
2004/0065151 A1    4/2004 Babala
(Continued)

FOREIGN PATENT DOCUMENTS

WO    2008033969 A2    3/2008
WO    WO-2009112937 A1 *    9/2009 ............ H04W 40/32
(Continued)

OTHER PUBLICATIONS

Extended Search Report issued in European Patent Application No. 21765200.7 dated Mar. 5, 2024, 9 pages.
(Continued)

*Primary Examiner* — Isam A Alsomiri
*Assistant Examiner* — Jonathan D Armstrong
(74) *Attorney, Agent, or Firm* — Jeffrey D. Frantz

(57) ABSTRACT

A sensor package may include a sensor housing unit and a first sensor that may acquire a first set of measurements within a first measurement range. The sensor package may also include a second sensor configured to acquire a second (Continued)

set of measurements within a second measurement range. The first measurement range and the second measurement range may include an overlapping range used to calibrate the first set of measurements, the second set of measurements, or both.

9 Claims, 15 Drawing Sheets

Related U.S. Application Data filed on Mar. 9, 2020, provisional application No. 62/984,639, filed on Mar. 3, 2020.

(56) References Cited

U.S. PATENT DOCUMENTS

| | | |
|---|---|---|
| 2005/0047275 A1 | 3/2005 | Chamberlain et al. |
| 2007/0291663 A1* | 12/2007 | Dixit ............ H04L 12/66 370/254 |
| 2010/0266062 A1 | 10/2010 | Mussmann et al. |
| 2011/0085415 A1 | 4/2011 | Morton et al. |
| 2011/0096623 A1* | 4/2011 | Crickmore ........... G01V 1/24 367/13 |
| 2011/0149295 A1* | 6/2011 | Crickmore ....... G01D 5/35303 356/477 |
| 2013/0263663 A1* | 10/2013 | Zhang ............... G01P 15/00 73/504.12 |
| 2015/0293243 A1* | 10/2015 | Avenson ............. G01H 9/00 73/1.85 |
| 2017/0146674 A1* | 5/2017 | Kryszczynski ...... G10K 11/004 |
| 2017/0146689 A1* | 5/2017 | Kryszczynski ...... G10K 11/004 |
| 2019/0277655 A1 | 9/2019 | Masad |
| 2020/0309805 A1* | 10/2020 | Romao ............... G01P 3/00 |
| 2023/0194742 A1* | 6/2023 | Fernihough .......... G01V 1/245 367/20 |

FOREIGN PATENT DOCUMENTS

| | | |
|---|---|---|
| WO | 2017090067 A1 | 6/2017 |
| WO | 2019168411 A1 | 9/2019 |

OTHER PUBLICATIONS

International Preliminary Report on Patentability for PCT/US2021/020236 mailed Sep. 15, 2022, 7 pages.
International Search Report and Written Opinion issued in PCT Application PCT/US2021/020236, dated Jun. 17, 2021 (10 pages).
Mesh networking, Wikipedia, downloaded on Aug. 23, 2022 from https://en.wikipedia.org/wiki/Mesh_networking (4 pages).
E Silva et al., (2018) Wireless positioning in IoT: A Look at Current and Future Trends, Sensors, 18, 2470 (19 pages).

* cited by examiner

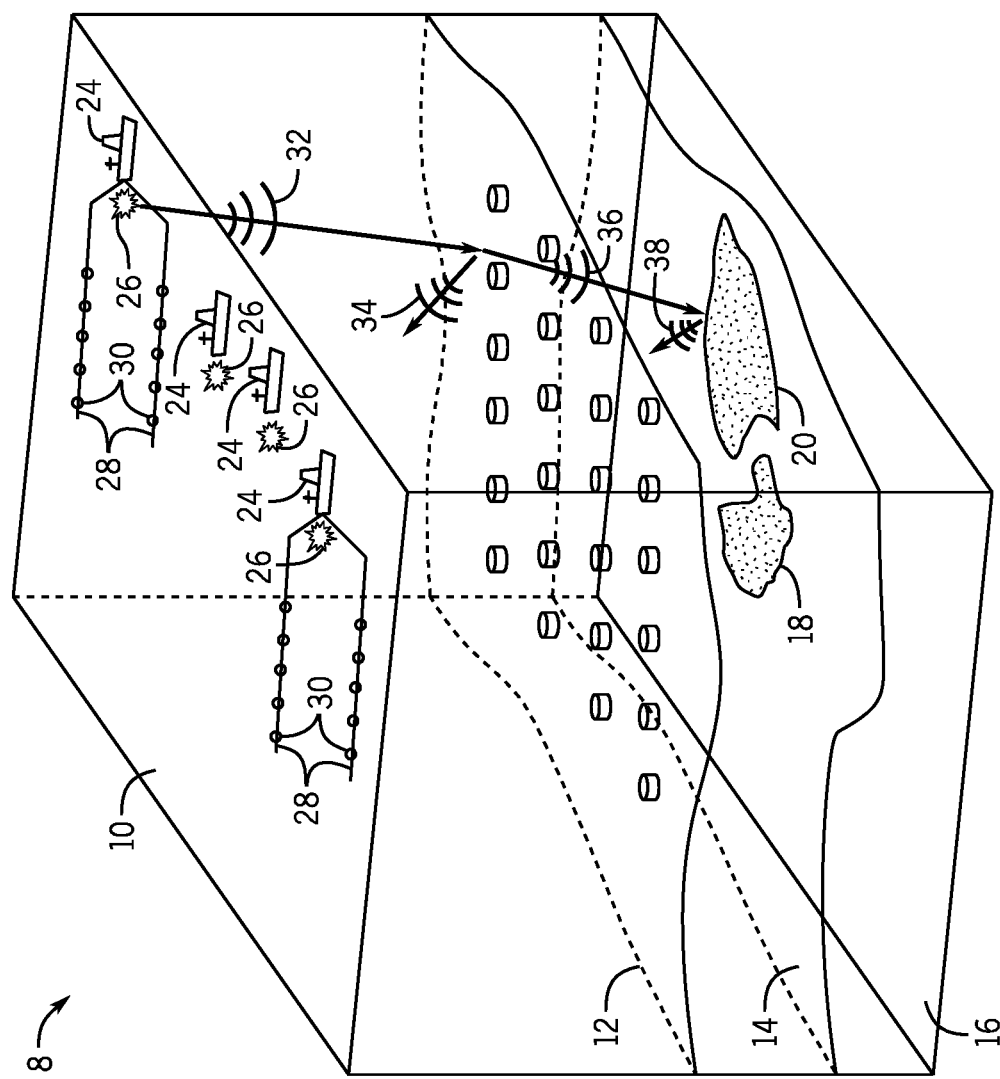
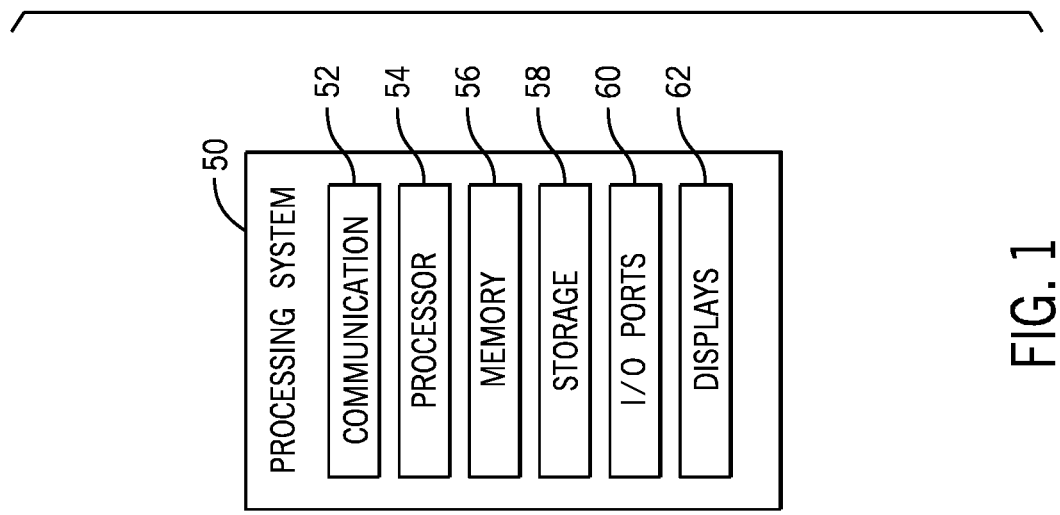
FIG. 1

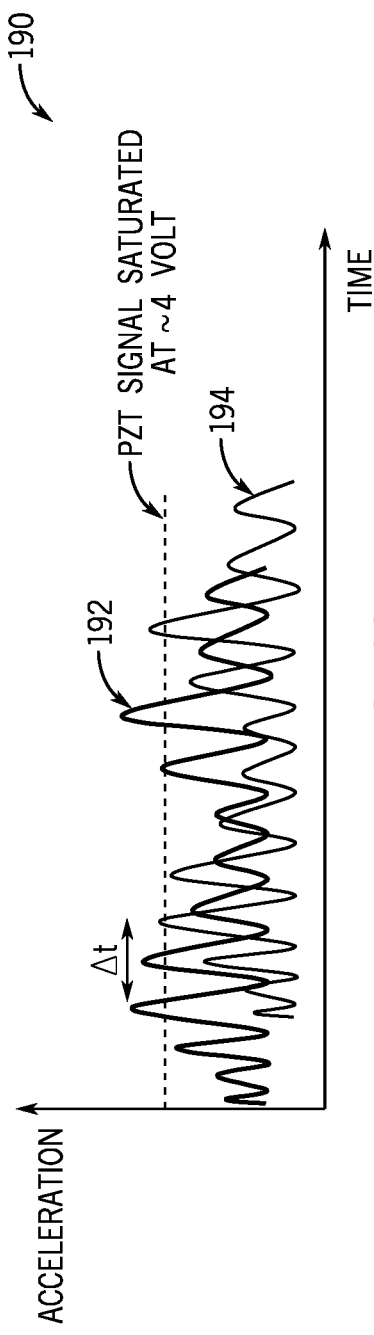
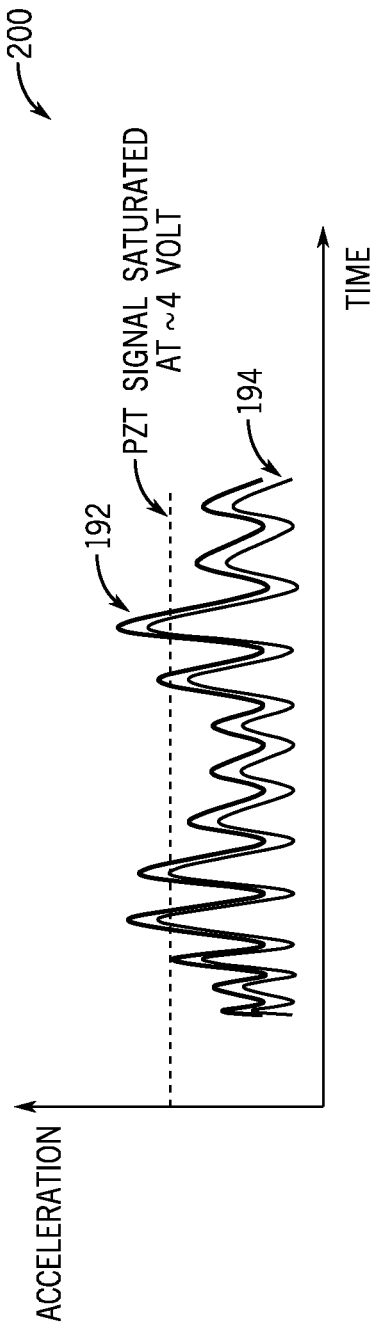
FIG. 11
FIG. 12

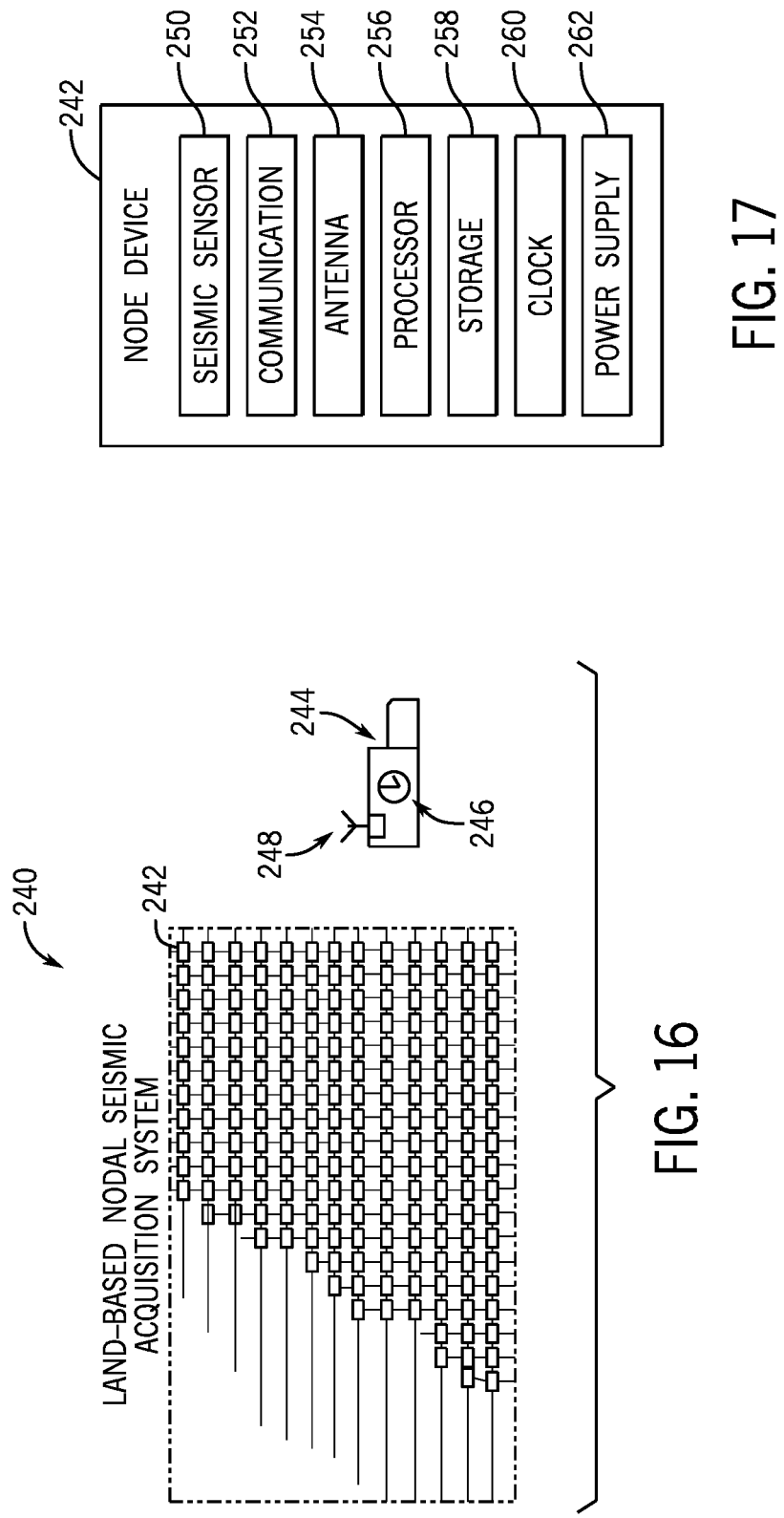

SYSTEMS AND METHODS FOR ENHANCING DATA ACQUISITION OPERATIONS IN SEISMIC SURVEYS

CROSS-REFERENCE TO RELATED APPLICATIONS

This application is a National Stage Entry of International Application No. PCT/US2021/020236, filed on Mar. 1, 2021, claims priority to and the benefit of U.S. Provisional Application Ser. No. 62/987,200, entitled "SYSTEM AND METHOD FOR SELF CALIBRATING HIGH DYNAMIC RANGE ACCELEROMETERS," filed on Mar. 9, 2020; U.S. Provisional Application Ser. No. 62/987,764, entitled "TIME SYNCHRONIZATION METHOD USING LOCAL WIRELESS COMMUNICATION DISTRIBUTED SEISMIC DATA ACQUISITION SYSTEM," filed on Mar. 10, 2020; and U.S. Provisional Application Ser. No. 62/984,639 entitled "MESH NETWORKS IN NODAL SEISMIC ACQUISITION SYSTEMS," filed on Mar. 3, 2020, each of which is incorporated by reference herein for all purposes.

BACKGROUND

The present disclosure relates generally to performing multiple data acquisition operations during seismic surveys. More specifically, the present disclosure relates to calibrating dynamic range sensors used in seismic surveys, time synchronizing seismic data acquisition systems used in seismic surveys, and implementing mesh communication networks between seismic data acquisition devices used in seismic surveys.

In hydrocarbon exploration, seismic images of underground layers are relied on to locate hydrocarbon reservoirs, such as oil fields. Thus, accuracy of the seismic images helps to more accurately determine locations of the hydrocarbon reservoirs. Indeed, seismic data acquired via seismic surveys map geologic structures by observation of seismic waves. That is, seismic waves created with artificial sources (e.g., dynamite or vibroseis) may be reflected or refracted from subsurface formations due to acoustic-impedance contrasts or high-velocity members. In practice, the reflected/refracted waves acquired by seismic sensors may be processed to determine locations of hydrocarbon deposits in subsurface regions of the earth. As such, improved methods for calibrating sensors used to acquire the seismic data and for communicating time-synchronized seismic data across a network may provide increased accuracy in the determined locations.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a sensor package may include a sensor housing unit and a first sensor that may acquire a first set of measurements within a first measurement range. The sensor package may also include a second sensor configured to acquire a second set of measurements within a second measurement range. The first measurement range and the second measurement range may include an overlapping range used to calibrate the first set of measurements, the second set of measurements, or both.

In another embodiment, a method may include receiving, via a processor, a remote clock signal via a communication protocol. The method may also include determining, via the processor, an expected transmission delay for the remote clock signal based on the communication protocol and synchronizing, via the processor, a clock based on the remote clock signal and the expected transmission delay.

In yet another embodiment, a system may include a plurality of node devices that may acquire seismic data. A first node device of the plurality of node devices may include a first communication range and a second node device that may receive a first set of signals from the first node device. The second node device may include a second communication range larger than the first communication range. The system may also include a third node device that may communicate with the first node device or the second node device, such that the third node device may include a third communication range larger than the first communication range and the second communication range.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWING

These and other features, aspects, and advantages of the present disclosure will become better understood when the following detailed description is read with reference to the accompanying drawings in which like characters represent like parts throughout the drawings, wherein:

FIG. 1 illustrates a schematic diagram of an example water seismic survey using multiple seismic measurements, in accordance with embodiments described herein;

FIG. 11 illustrates a graph representative of signals received from the accelerometers of the sensor package in FIG. 8, in accordance with embodiments described herein;

FIG. 12 illustrates a graph representative of time-shifted signals, in accordance with embodiments described herein;

FIG. 16 illustrates an example nodal seismic acquisition system, in accordance with embodiments described herein;

FIG. 17 illustrates a block diagram of a node device that may be part of the example nodal seismic acquisition system of FIG. 16, in accordance with embodiments described herein;

DETAILED DESCRIPTION

Figure 2:
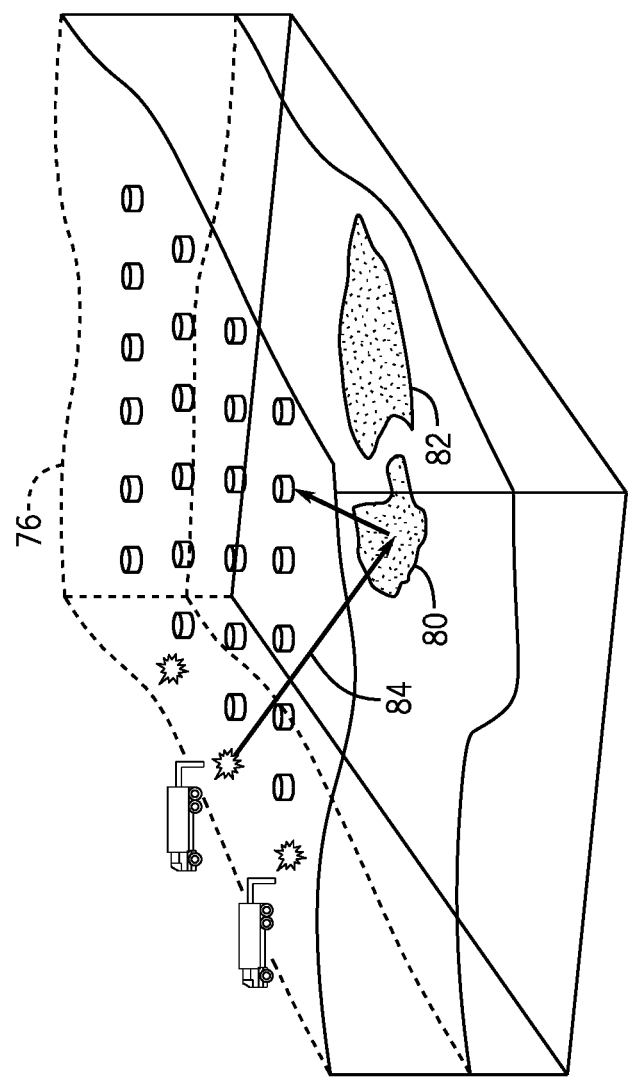
FIG. 2 illustrates a schematic diagram of an example land seismic survey using multiple seismic measurements, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As mentioned above, in hydrocarbon exploration, seismic images of underground layers are relied on to locate hydrocarbon reservoirs, such as oil fields. Thus, accuracy of the seismic images helps to more accurately determine locations of the hydrocarbon reservoirs. To obtain seismic images, seismic waves created with artificial sources (e.g., dynamite or vibroseis) may be reflected or refracted from subsurface formations due to acoustic-impedance contrasts or high-velocity members and captured using seismic sensors. In practice, observing the arrival times of the reflected/refracted waves corresponds to measuring ground motions (e.g., displacements, velocities, or accelerations). Ground motions may be measured through motion-sensing devices such as geophones.

However, as the demands for more quantitative seismic data acquisition increase, the use of lightweight, broadband, and accurately calibrated sensors is emerging. In addition, multi-component seismic recordings call for 3-component (3C) receivers that integrate or communicate with other field electronics and sensors. With this in mind, acceleration-sensing devices, such as accelerometers (e.g., Micro-Electromechanical Systems (MEMS) microchips) may provide broader bandwidth with regard to measurement range, more accurate amplitude data, and less sensitivity to planting tilt as compared to other geophones.

With the foregoing in mind, to provide an increased dynamic range for seismic survey, two or more accelerometers may be integrated into the same ground motion sensor package. As such, in certain embodiments, the two or more accelerometers may have different dynamic ranges in ground motion measurements. However, the integrated accelerometers in the ground motion sensor package may be subjected to deviations which may influence the sensor stability and accuracy. For instance, the accelerometers may exhibit offset, drift, temperature variations, aging, poor ground mechanical coupling, tilt, and the like. These deviations may cause measurement uncertainties that may sometimes lead to inaccurate measurements. To reduce measurement uncertainties, the accelerometers may be re-calibrated either periodically based on acquisition field conditions, or before they are deployed in the field. The calibration process may be implemented by installing a reference accelerometer close to the accelerometer to measure sensitivity in an operating frequency domain of the acceleration being calibrated. Such calibration process may become challenging when several accelerometers are to be calibrated at the same time (e.g., during a batch manufacturing process, or in a non-laboratory environment such as a field deployment).

Another challenge may result from the large dynamic range encountered in ground motion measurements. The dynamic range of an accelerometer is the difference between the minimum measurable signal (e.g., noise floor) and the maximum measurable signal. For a measurement to be valid, the signals should be within the range defined by the minimum and maximum limits. A broad dynamic range is important is important for seismic applications because large variations in signal amplitudes are often presented in seismic acquisition. For example, the signal amplitude variations may vary from nano-g (ng, or 10-9 g) to g (where g is gravitational constant, 1 g=9.81 m/s2), which represents a ratio greater than ten million.

Keeping the foregoing in mind, in certain embodiments as described herein, two or more accelerometers with different dynamic measurement ranges and self-calibration capabilities may be combined into a single sensor package. Such a combination may provide an increased dynamic range, improved accuracy, repeatability, and reliability, and reduced re-calibration time and cost. For example, the sensor package may include two accelerometers enclosed in a sensor housing unit. The two accelerometers may have different dynamic measurement ranges. The two different dynamic measurement ranges may have an overlapping area. One of the two accelerometers may have a better calibration stability for an extended time period as compared to another accelerometers. Therefore, a portion of the acceleration measurements (within the overlapping area) from the accelerometer with the better calibration stability may be used to calibrate the acceleration measurements from another accelerometer via a calibration process.

By way of introduction, FIG. 1 illustrates a schematic diagram of a marine seismic survey 8 that may acquire multiple seismic measurements. As shown in FIG. 1, the marine seismic survey may be performed on body of water (e.g., ocean) having a surface 10 and a water bottom 12. Multiple subsurface layers (e.g., subsurface layers 14 and 16) may be located beneath the water bottom 12. Geological formations, such as subsurface formations 18 and 20 embedded in the subsurface layers, may contain hydrocarbon deposits. Seismic data acquired via the marine seismic survey 8 may be used to image the water bottom 12, the subsurface layers 14 and 16, and the subsurface formations 18 and 20. Images of subterranean geologic structures may provide indications of the hydrocarbon deposits that may later be extracted using a variety of hydrocarbon extraction processes.

In some embodiments, the marine seismic survey may include ocean bottom node (OBN) measurements by employing multiple ocean bottom nodes (OBNs) 22 positioned on the water bottom 12. The OBNs 22 may be deployed (e.g., using remotely operated vehicles (ROVs)) to selected locations and form a certain geometry. Each of the OBNs 22 may include one or more OBN sensors. The OBN sensors may include one or more geophones (e.g., single-component, two-component, three-component geophones). In some embodiments, the OBN sensors may also include hydrophones.

One or more seismic source vessels 24 may be used in the marine seismic survey. In some embodiments, each source vessel 24 may tow a seismic source 26 that may be used to create seismic waves propagating downward into the subterranean geologic structures. Each of the seismic sources 26 may include one or more source arrays, such that each source array may include a certain number of air guns or other seismic wave generating device.

The marine seismic survey 8 may also include multiple streamers 28 traversing the body of water to obtain streamer measurement data. For example, the source vessels 24 may tow multiple (e.g., two, four, six, eight, or ten) streamers 28. The streamer measurement data may be acquired simultaneously with the OBN measurement using shots fired by the seismic sources 26. That is, each streamer 28 may include multiple streamer sensors 30. For example, each of the streamers 28 may include streamer sensors 30, which may detect water pressure changes or reflected acoustic signals caused by reflected seismic waves that arrive at the streamer sensors 30. In this way, the seismic waves generated by the sources 26 may be reflected off of the subterranean regions at or under the water bottom 12, and the reflected seismic waves may be detected by the streamer sensors 30. Although the following description of the embodiments described herein are detailed with four source vessels, it should be noted that the techniques described herein may be performed using any suitable number of source vessels, streamers, streamer sensors, and the like. Indeed, the embodiments described herein should not be limited to the description in FIG. 1.

In some embodiments, the marine seismic survey may include vertical seismic profile (VSP) measurement by employing seismic sensors (e.g., fiber-optic sensors, geophones, or hybrid sensors) in one or more wells. For example, a hybrid sensor array including fiber-optic sensors and geophones may be disposed along a wireline cable deployed in a borehole of a well, which may be drilled into the subsurface formation 16. The fiber-optic sensors may measure strains caused by reflected or refracted seismic waves traveling along the hybrid sensor array. The geophone may measure ground motions (e.g., particle movements such as velocity and acceleration) caused by seismic waves traveling along the hybrid sensor array.

During the marine seismic survey 8, the seismic source 26 may be activated to generate seismic waves 32 traveling downward into the subterranean geologic structures. When the seismic waves 32 arrives at the water bottom 12, a portion of seismic energy contained in the seismic waves 32 is reflected by the water bottom 12. Reflected waves 34 travel upward and arrive at different sensors, such as the streamer sensors 30, where they are measured. Another portion of the seismic energy contained in transmitted seismic waves 32 is propagated through the water bottom 12 into the subsurface layer 14 as seismic waves 36. A portion of seismic energy contained in the transmitted waves 36 is reflected by the subsurface formation 16. Reflected waves 38 travel upward and arrive at the different sensors, where they are measured by the corresponding sensors.

It should be noted that the elements described above with regard to the marine seismic survey 8 are exemplary elements. For instance, some embodiments of the marine seismic survey may include additional or fewer elements than those shown. For example, as mentioned above, the marine seismic survey may include different number of source vessels. In some embodiments, separated receiver vessels may be used to tow the streamers. In some embodiments, the streamer measurement may be acquired independently from the OBN measurement for operational or logistical reasons.

Seismic data acquired from different sensors may be collected and processed by a processing system 50. The processing system 50 may include a communication component 52, a processor 54, a memory 56, a storage 58, input/output (I/O) ports 60, a display 62, and the like. The communication component 52 may be a wireless or wired communication component that facilitates communication between the processing system 50 and the streamer sensors 30 or any other suitable electronic device. The processor 54 may be any type of computer processor or microprocessor capable of executing computer-executable code. The processor 54 may also include multiple processors that may perform the operations described below.

The memory 56 and the storage 58 may be any suitable article of manufacture that may serve as media to store processor-executable code, data, or the like. These articles of manufacture may represent computer-readable media (i.e., any suitable form of memory or storage) that may store the processor-executable code used by the processor 54 to perform the presently disclosed techniques. The memory 56 and the storage 58 may represent non-transitory computer-readable media (e.g., any suitable form of memory or storage) that may store the processor-executable code used by the processor 54 to perform various techniques described herein. It should be noted that non-transitory merely indicates that the media is tangible and not a signal.

The I/O ports 60 may couple to the streamer sensors 30, one or more input devices, one or more displays, or the like to facilitate human or machine interaction with processing system 50 or other components of the marine seismic survey 8. The display 62 may operate to depict visualizations associated with software or executable code being processed by the processor 54. In one embodiment, the display 62 may be a touch display capable of receiving inputs from a user of the processing system 50. The display 62 may be any suitable type of display, such as a liquid crystal display (LCD), plasma display, or an organic light emitting diode (OLED) display, for example. Additionally, in one embodiment, the display 62 may be provided in conjunction with a touch-sensitive mechanism (e.g., a touch screen) that may function as part of a control interface for the processing system 50.

It should be noted that the components described above with regard to the processing system 50 are exemplary components and the processing system 50 and may include additional or fewer components as shown. For example, the processing system 50 may include one or more communication interfaces to send commands to different seismic acquisition systems and receive measurement from the different seismic acquisition systems.

In addition to the marine seismic survey 8, seismic data may be acquired via a land seismic survey. As such, referring to FIG. 2, the land seismic survey 70 may be employed to obtain information regarding a subsurface region of the Earth in a non-marine environment. The land seismic survey 70 may include a land-based seismic sources 72 and land-based sensors 74. The land-based seismic source 72 (e.g., seismic vibrator) that may be disposed on a surface 76 of the earth above the subsurface region 78 of interest. The land-based seismic source 72 may produce energy (e.g., sound waves, seismic waveforms) that is directed at the subsurface region 78. Upon reaching various geological formations 80 and 82 (e.g., salt domes, faults, folds, hydrocarbon deposits) within the subsurface region 78 the energy output 84 by the land-based seismic source 72 may be reflected off of the geological formations 80 and 82 and acquired or recorded by one or more land-based sensors 74.

In some embodiments, the land-based sensors 74 may be dispersed across the surface 76 to form a grid-like pattern. As such, each land-based sensor 74 may receive a reflected seismic waveform in response to energy being directed at the subsurface region 78 via the seismic source 72. In some cases, one seismic waveform produced by the seismic source 72 may be reflected off of different geological formations 80 and 82 and received by different sensors 74. The land-based sensors 74 may also include cable-based sensors in which the land-based sensors 74 are connected together via a cable.

Regardless of how the seismic data is acquired, the processing system 50 described above with reference to FIG. 1 may analyze the seismic waveforms acquired by the marine-based streamer sensors 30 or the land-based sensors 74 to determine information regarding the geological structure, the location and property of hydrocarbon deposits, and the like within the subsurface region 78.

Calibrating Accelerometers

With the foregoing in mind, the Oil and Gas (O&G) industry is continuously finding ways improve the subsurface imaging quality of seismic data acquired via the marine seismic survey 8 or the land-based seismic survey 70 to better find and produce hydrocarbons, such as crude oil and natural gas. High-quality subsurface imaging demands high quality seismic data as input for post survey signal processing and modeling powered by high-performance computing and advanced imaging algorithms. Such demand creates new challenges for ground motion sensors (e.g., accelerometers and geophones) that are widely used in seismic and gravity data acquisitions.

Figures 3, 4:
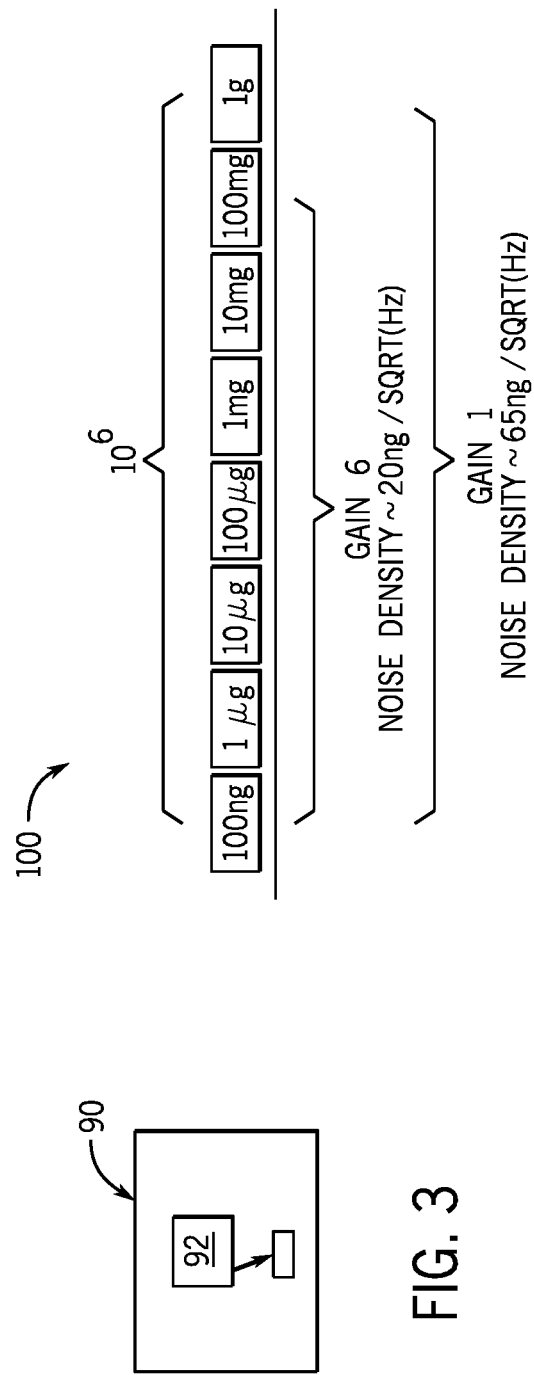
FIG. 3 illustrates an example sensor package that may be used in the water seismic survey of FIG. 1 or the land seismic survey of FIG. 2, in accordance with embodiments described herein.
FIG. 4 illustrates example ranges of acceleration measurements that may be acquired by the sensor package of FIG. 3, in accordance with embodiments described herein.

By way of example, the land-based seismic sensors 74 may detect ground roll measurements, which may include a type of coherent noise in land-based seismic surveys 70. The ground roll may be characterized by low frequencies and high-amplitudes. The ground roll may mask the reflected seismic energy detected by the land-based seismic sensors 74. In some embodiments, each of the land-based seismic sensors 74 may include one accelerometer as shown in FIG. 3, which includes a block diagram of a sensor package 90 that may represent an example land-based seismic sensor 74. The sensor package 90 may include one accelerometer 92 that may measure acceleration (e.g., rate of change of velocity) of a body (e.g., surface) in one or more coordinate directions (e.g., X-Y-Z coordinate system).

Different types of accelerometers 92 exhibit different sensitivity and accuracy properties. For example, FIG. 4 illustrates an example of acceleration measurement range 100 with a corresponding accuracy specification. As illustrated in FIG. 4, during ground motion measurement operations using the accelerometer 92, signal amplitudes may exhibit a high dynamic measurement range (e.g., 106). For example, the signal amplitude variations may vary from around 500 ng to 0.5 g, which represents a ratio of one million. With this in mind, high calibration accuracy systems or devices (e.g., 1% accuracy) may be used to achieve calibrated acceleration output that may help to ensure the measurement accuracy in a wide dynamic range. The noise density associated with acceleration measurement may be approximated to 20 ng/SQRT(Hz) (nano-g per square-root Hertz). Besides the demands listed above, the acceleration measurement may have other demands, such as no transverse sensitivity, no electromagnetic (EM) sensitivity, no temperature sensitivity, no drift, good mechanical coupling, and the like.

To obtain the wide dynamic range demanded in acceleration measurement shown in FIG. 4, in some embodiments, the accelerometer 92 may be set with a high-gain mode when measuring small accelerations of ground motion caused by weak seismic waves and set with a low-gain mode when measuring large accelerations of ground motion caused by strong seismic waves. For example, as shown in FIG. 4, the accelerometer 92 may have at least two gain modes such as Gain 6 and Gain 1. Gain 6 may be used to set the accelerometer 92 to measure small accelerations (e.g., less than a threshold) of ground motion, and Gain 1 may be used to set the accelerometer to measure both small and large accelerations (e.g., greater than a threshold) of ground motion. Different modes can be switched during field seismic acquisition based on survey conditions (e.g., seismic source type, reflection/refraction wave strength, sensor mechanical coupling, and the other relevant conditions) via the processing system 50 or the like. However, such single type sensor package 90 with adjustable gains may face challenges when ground motion anomalies coexist in seismic waves arriving to the accelerometer 92. For instance, the seismic arrivals may contain both small accelerations (e.g., 10-7 g to 10-5 g), as well as large accelerations (e.g., 0.1 g to 1 g) in a close time range, may pose difficulties for the accelerometer 92 to switch between different gain modes. For example, an accelerometer set with high gain mode (e.g., Gain 6), when detecting strong ground motions, may be saturated and output measurement data with degraded accuracy.

Figure 6:
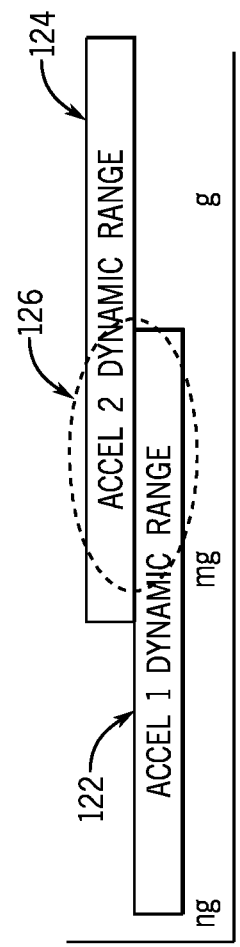
FIG. 6 illustrates example ranges of acceleration measurements that may be acquired by the sensor package of FIG. 5, in accordance with embodiments described herein.
Figure 5:
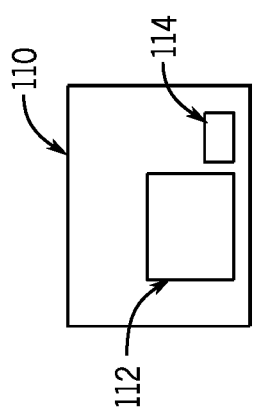
FIG. 5 illustrates an example sensor package that includes two accelerometers, in accordance with embodiments described herein.

With this in mind, FIG. 5 illustrates a different approach to fulfill a wider dynamic range acceleration measurement. In the illustrated example, a sensor package 110 may include two accelerometers 112 and 114, such that each accelerometer may include different dynamic ranges as depicted in a combined acceleration measurement range 120 of FIG. 6. By using two accelerometers 112 and 114 with different dynamic ranges, the sensor package 110 may possess self-calibration capabilities by employing one accelerometer's measurement to another. As illustrated in FIG. 6, acceleration measurement range 122 of the accelerometer 112 and acceleration measurement range 124 of the second accelerometer 114 have overlapping ranges 126. In this way, at least a portion of the overlapping ranges 126 may be used for data calibration. For example, the accelerometer 124 may have a better calibration stability (e.g., no calibration needed for certain amount of time) as compared to the accelerometer 112. In this way, calibration may be performed using the acceleration data measured by the accelerometer 114 within an area for automatic calibration (e.g., overlapping ranges 126) to calibrate the acceleration data measured by the accelerometer 112.

Figure 7:
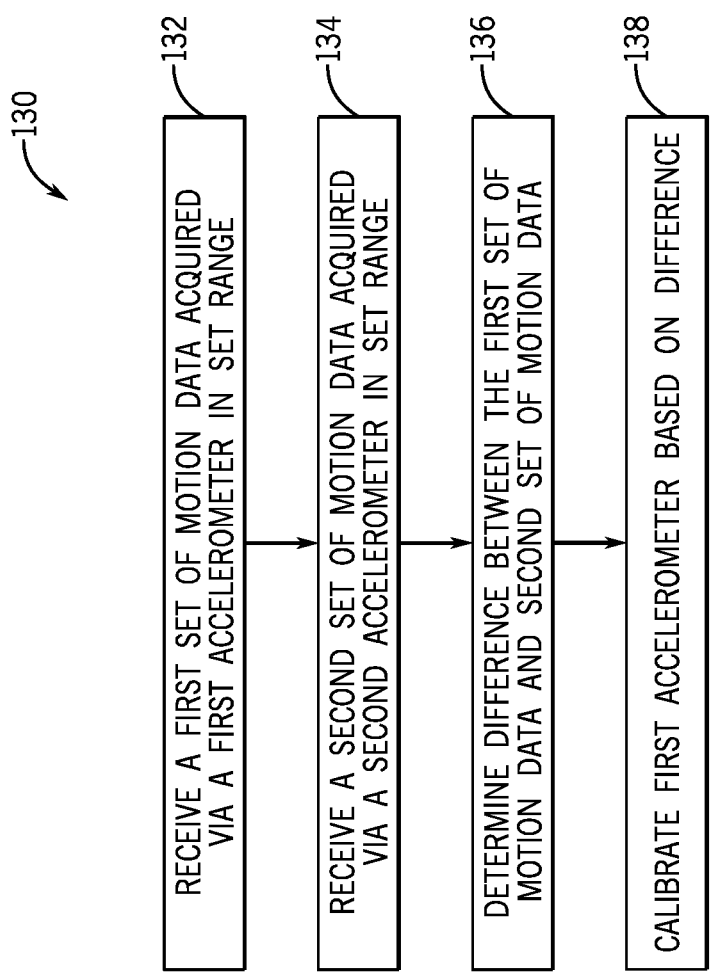
FIG. 7 illustrates a flow chart of a method for calibrating one accelerometer based on measurements acquired by another accelerometer in the same sensor package, in accordance with embodiments described herein.

Keeping this in mind, FIG. 7 illustrates a flow chart of a method 130 for calibrating one accelerometer that may be part of a sensor package (e.g., land-based seismic sensor 74) using measurements of another accelerometer that may be part of the same sensor package. Although the following description of the method 130 will be described as being performed by the processing system 50, it should be noted that the method 130 may be performed by any suitable computing device. In addition, although the following description of the method 130 will be described in a particular order, it should be understood that the method 130 may be performed in any suitable order.

Referring now to FIG. 7, at block 132, the processing system 50 may receive a first set of motion data acquired by the accelerometer 112 of the sensor package 110. The first set of motion data may include ground roll measurements in one or more directions. In some embodiments, the processing system 50 may perform the calibration process described in the method 130 when the first set of motion data includes acceleration measurements within a set range. For instance, the set range may correspond to the overlapping ranges 126 described above. That is, the set range may correspond to measurement ranges in which the accelerometers 112 and 114 are capable of detecting and measuring.

At block 134, the processing system 50 may receive a second set of motion data acquired by the accelerometer 114 of the sensor package 110. The second set of motion data may be acquired simultaneously by the accelerometer 114 while the accelerometer 112 acquires the first set of motion data. As such, the second set of motion data may be within the set range in which the two accelerometers 112 and 114 share the overlapping ranges 126.

After receiving the two sets of motion data, the processing system 50, at block 136, may determine a difference between the two sets of motion data. In some embodiments, one of the two accelerometers 112 and 114 may yield more accurate measurements due to its calibration properties (e.g., calibration life). In this case, the accelerometer having the higher calibration properties may be used to calibrate the measurements of the other accelerometer. As such, at block 138, one of the two sets of motion data acquired at blocks 132 and 134 may be calibrated based on the difference between the two sets of motion data within the set range.

In certain applications, the dynamic range of any sensor package may be limited at a high end by saturation of the electronics output and at a low end by one or more physical limits (e.g., thermal noise, random noise, acoustic sources, EM noise, and other related limits) and/or by the number of binary digits (bits) used. By combining the two accelerometers 112 and 114 into the same packaging, low end resolution may be obtained using a highly sensitive accelerometer (e.g., accelerometer 114) with suitable electronics gain to avoid saturation, while extending the high end of the dynamic range of measurement by orders of magnitude with high calibration accuracy (e.g., 1% of accuracy).

With the integration of at least two accelerometers with different and complementary dynamic ranges, acceleration data from one accelerometer may be used to automatically calibrate acceleration data from another accelerometer continuously or periodically. For example, the processing system 50 may automatically calibrate the acceleration data each time both accelerometers 112 and 114 acquire acceleration data in the overlapping range 126. As a result, the sensor integration provides an extended dynamic range by blending sensor data while avoiding saturation due to strong source excitation. Such automatic calibration capability may eliminate or reduce the need to calibrate accelerometers, resulting in less manual operations, reduced capital expense, and improved sensor manufacture efficiency.

Figure 8:
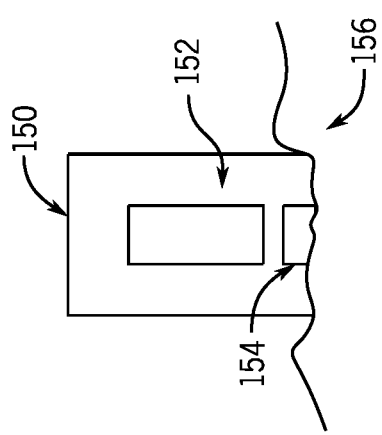
FIG. 8 illustrates example sensor package that includes a Micro-electromechanical systems-based (MEMS-based) accelerometer and a piezoelectric ceramic material-based (PZT-based) accelerometer, in accordance with embodiments described herein.

In certain embodiments, specific types of accelerometers may be provided within the sensor package 110 to provide improved calibration results. For example, referring now to FIG. 8, a sensor package 150 may include two accelerometers 152 and 154. The sensor package 150 may be placed into a ground floor 156 with certain ground mechanical coupling. In the illustrated embodiment, the accelerometers 152 may be made of certain piezoelectric materials, which may generate electric charge due to deformations (such as deformation caused by ground motion). The accelerometer 154 may include a Micro-Electro-Mechanical Systems-based (MEMS-based) accelerometer with certain calibration stability (e.g., calibration-free for 5 years). In some embodiments, the accelerometer 152 may be made of PZT (Pb[Zr(x)Ti(1−x)]O3, or lead zirconate titanate), which is a type of piezoelectric ceramic with high sensitivity that allows resolving very small acceleration signals (e.g., a few nano-g). In some embodiments, the accelerometer 152 may use bimorph PZT to reduce a transverse effect. The PZT-based accelerometer 152 may also use suited electronics with a level of amplification that allows accurate acceleration measurements that are less than a certain threshold. The PZT-based accelerometer 152 may have higher resonance frequency that the accelerometer 154 and, in some embodiments, may be used for dynamic measurement only and may avoid axis of rotation during sensor deployment.

The MEMS-based accelerometer 154 may provide calibrated output with one-dimensional (1D) or three-dimensional (3D) acceleration measurements for dynamic or static (DC) measurements. For example, the accelerometer 154 may provide a one-dimensional calibrated acceleration measurement as a reference accelerometer. In some embodiments, the accelerometer 154 may provide a three-dimensional calibration for transverse acceleration and tilt measurements. In addition, the accelerometer 154 may provide an inclination measurement. In some cases, the accelerometer 154 may provide diagnostic and quality control so that the drift associated with the PZT-based accelerometer 152 or sensor package mechanical coupling deficiency may be accurately diagnosed.

Figure 9:
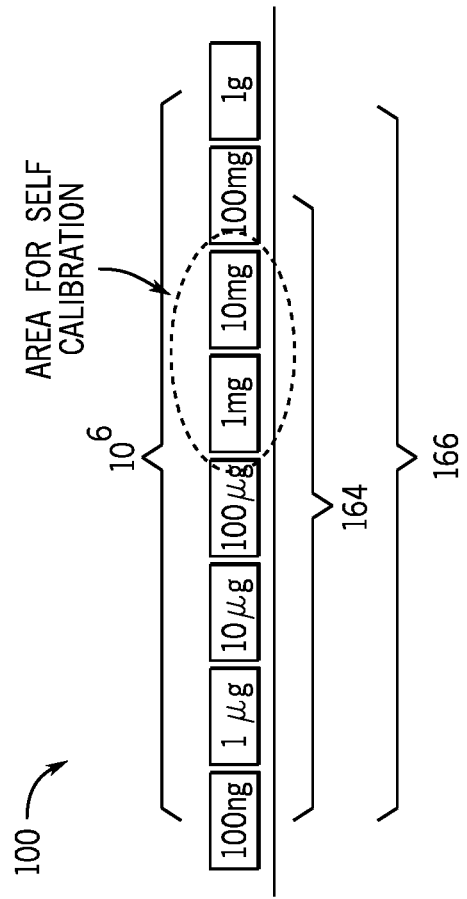
FIG. 9 illustrates example ranges of acceleration measurements that may be acquired by the sensor package of FIG. 8, in accordance with embodiments described herein.

With the foregoing in mind, FIG. 9 illustrates respective measurement ranges of the PZT-based accelerometer 152 and the MEMS-based accelerometer 154. For example, the accelerometer 152 may provide acceleration measurement between 100 ng to 10 mg (e.g., range 162), while the accelerometer 154 may provide acceleration measurement between 0.1 mg to 1 g (e.g., range 164). As such, an overlapping range may correspond to an area for self-calibration (e.g., ranging from 1 mg to 10 mg) and may be used for automatic calibration. As previously discussed, the principle of an automatic calibration is based on the continuously and/or periodically calibrating the highly sensitive high-resolution sensing element (e.g., PZT-based accelerometer 152) against a stable low sensitive low-cost MEMS accelerometer reference (e.g., MEMS-based accelerometer 154).

The MEMS-based accelerometer 154 may provide acceleration measurement with high accuracy (e.g., 1% accuracy). Due to their small seismic mass, the MEMS-based accelerometer 154 may be made with robust sensor deign with high resonance frequency, therefore enabling better polynomial fitting and increased frequency operating range. As a result, the response curve is flat in the seismic frequency domain with no phase shift. In some embodiments, the MEMS-based accelerometers 154 may be provided with calibration by the manufacturer (e.g., with a 5-year calibration stability). In addition, a MEMS self-calibration process may be performed with the earth gravity (e.g., vertical/horizontal output). As such, sufficiently high acceleration events (e.g., greater than 1 mg) from stable low sensitive accelerometer (e.g., MEMS-based accelerometer 154) may be used to calibrate the highly sensitive accelerometer (e.g., PZT-based accelerometer 152).

Indeed, a merge or blending of the measurements from the PZT-based accelerometer 152 and the MEMS-based accelerometer 154 with an automatic calibration process increases the detectable dynamic range while avoiding the likelihood of the saturation of the accelerometer 152 due to a strong source excitation. As such, the merge of the measurements from two accelerometers may provide an enhanced measurement output. Additional details with regard to the automatic calibration process is described below with reference to FIG. 10.

Before discussing the automatic calibration process, it should be noted that the sensor package 150 may provide calibrated 3-axis measurements, transverse sensitivities, sensor inclination (tilt), sensor ageing/quality information, sensor mechanical coupling information, data quality control, and the like. Furthermore, the sensor package 150 may compensate the unwanted sensitivity (e.g., due to EM or acoustic noise) in the PZT-based accelerometer 152, track record of calibration coefficients that may change with time, provide a mean of running continuous diagnostics on the sensors using the internal reference accelerometer, and the like. For example, the MEMS-based accelerometer 154 may include 3-axis accelerometers to measure 3-component (3C) of the ground motion, and the calibrated 3C output may be used to correct the PZT-based first accelerometer transverse sensitivity. In addition, the ground mechanical coupling may be determined by comparing signal amplitudes of sensors located in the same area. In some embodiments, a magnetometer may be included into the MEMS-based accelerometer 154 to provide transverse acceleration directions. Additionally, the MEMS-based accelerometer 154 may be used as a shock detector.

Figure 10:
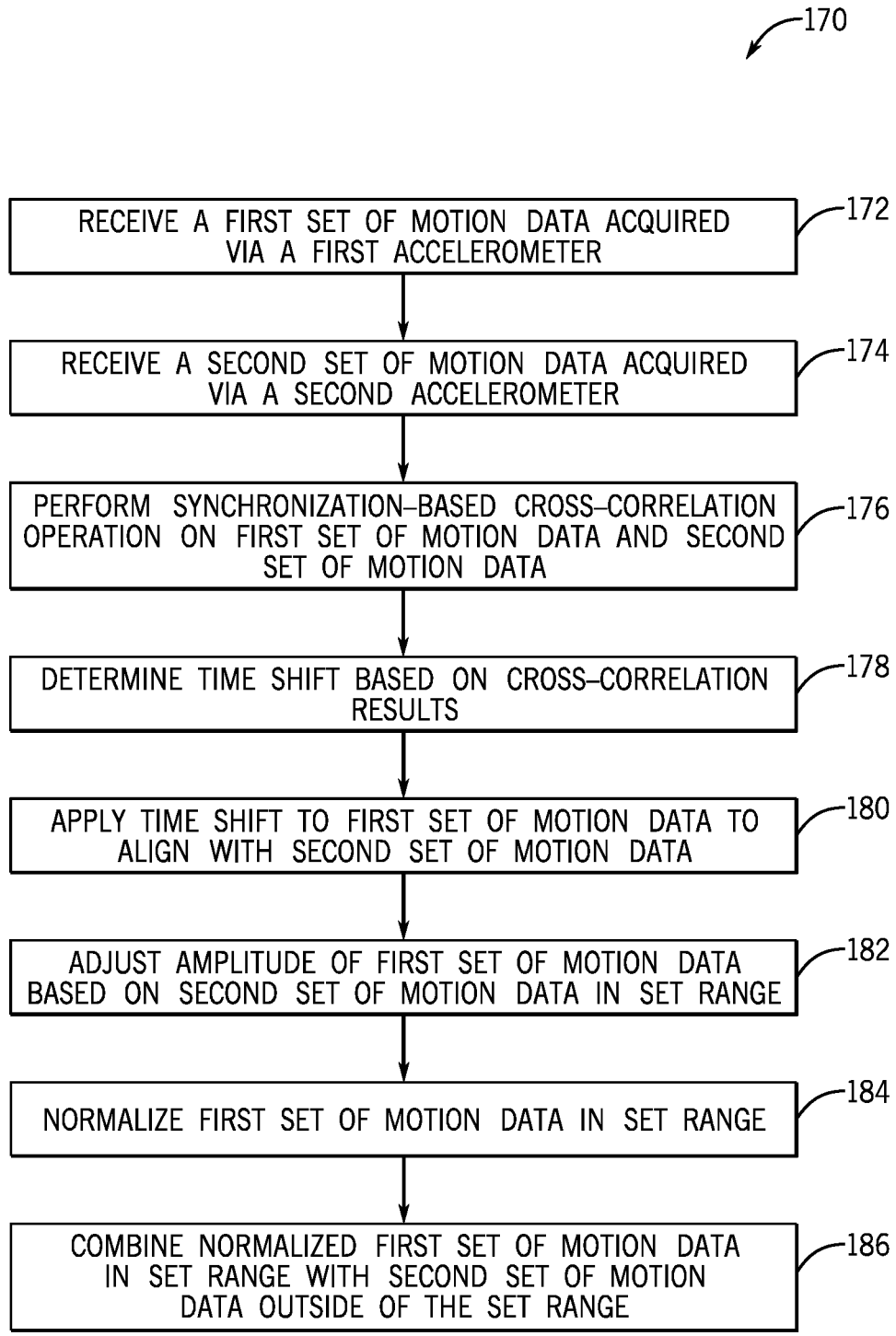
FIG. 10 illustrates a flow chart of a method for combining measurements acquired by two accelerometers in the same sensor package, in accordance with embodiments described herein.

With the forgoing in mind, further details of the automatic calibration are provided below with reference to FIGS. 10-15. Referring first to FIG. 10, a flowchart of a method 170 for combining measurements of the accelerometer 152 and the accelerometer 154 of the sensor package 150 is detailed below. Like the method 130 described above, although the method 170 may be described as being performed by the processing system 50 and in a particular order, it should be understood that the method 170 may be performed in any suitable order and using any suitable computing device. In addition, although the method 170 is described using the sensor package 150 described above, it should be noted that the method 170 may be applied to other sensor packages having multiple accelerometers.

Referring now to FIG. 10, blocks 172 and 174 may correspond to blocks 132 and 134 above. That is, the first set of motion data may be received from the accelerometer 152 and the second set of motion data may be received from the accelerometer 154. By way of example, the sets of motion data acquired at blocks 172 and 174 (e.g., acceleration measurements) acquired from the accelerometer 152 and the accelerometer 154 may exhibit a time shift between each other, as shown in a graph 190 of FIG. 11. As shown in FIG. 11, a signal 192 from the accelerometer 152 (e.g., output in volt) shows a time shift $\Delta t$ from a signal 194 from the accelerometer 154 (e.g., output in g). In some embodiments, the signal 192 may be saturated at certain magnitude (e.g., 4 volts) due to strong source excitation. As such, measurements acquired by the accelerometer 152 that exceed the magnitude or threshold may be unreliable.

At block 176, the processing system 50 may perform a synchronization-based cross-correlation operation on the first set of motion data and the second set of motion data. That is, the time shift $\Delta t$ between the signals 192 and the signal 194 from the different accelerometers 152 and 154 may be resolved by synchronization-based on cross-correlation. The cross-correlation may include a measurement of similarity of two series (e.g., time series in present example) as a function of a displacement of one series relative to another series. By calculating the cross-correlation between the signals 192 and 194, the processing system 50 may derive the time shift $\Delta t$ at block 178.

After deriving the time shift $\Delta t$, at block 180, the processing system 50 may apply the time shift $\Delta t$ to the first set of motion data or shift the signal 192 along the time axis to make it align with the signal 194, as shown in graph 200 of FIG. 12. Alternatively, in some embodiments, the processing system 50 may apply the time shift $\Delta t$ to the second set of motion data or shift the signal 194 back along the time axis to make it align with the signal 192.

Figure 13:
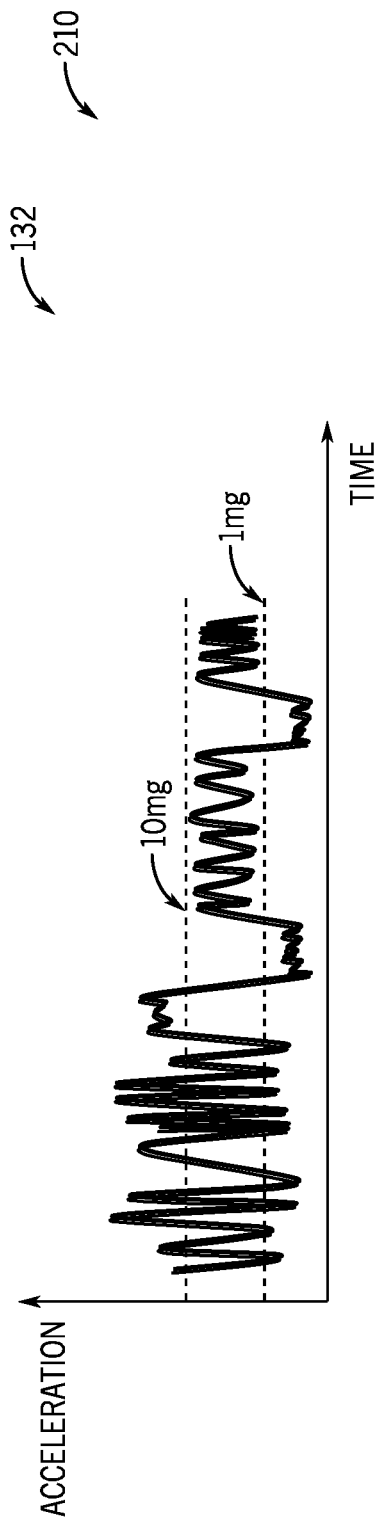
FIG. 13 illustrates a graph representative of amplitude-calibrated signals, in accordance with embodiments described herein.

In any case, after shifting the respective set of motion data, at block 182, the processing system 50 may adjust an amplitude of the first set of motion data based on the second set of motion data. That is, after the signal 192 is aligned (e.g., synchronized) with the signal 194, the processing system 50 may perform an amplitude calibration. For example, based on measurement accuracy and reliability (e.g., due to small or large acceleration measurements), a portion of acceleration data between two thresholds may be selected for calibration usage. By way of example, FIG. 13 illustrates a graph 210 in which a low-end threshold of 1 mg and a high-end threshold of 10 mg may be used to select the acceleration data. That is, the acceleration data falling between the two thresholds may be used for data calibration.

At block 184, the processing system 50 may normalize the sets of motion data. That is, the data calibration in an amplitude domain may include a process to normalize the signal 192 (output in volt) to the signal 194. In other words, the data calibration may include a process to find calibration coefficients (in volt/g), which may be used to normalize the signal 192 (e.g., dividing the signal 192 by the calibration coefficients) to make the signal 192 equal to the signal 194, as shown in graph 220 of FIG. 14. The calibration coefficients may be a function of the frequency. As a result, the calibrated signal 192 may then be provided in g instead of volt after the amplitude calibration.

Figure 14:
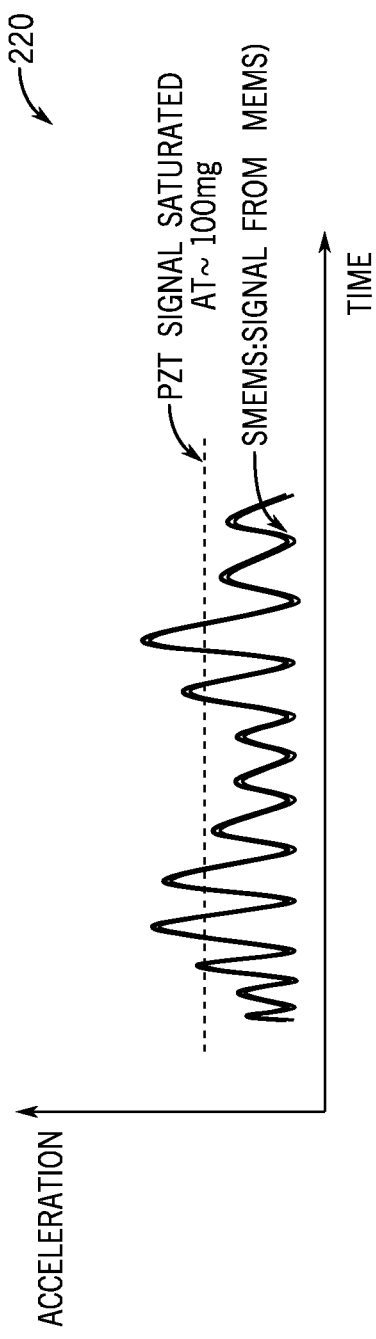
FIG. 14 illustrates a graph representative of normalized signals, in accordance with embodiments described herein.
Figure 15:
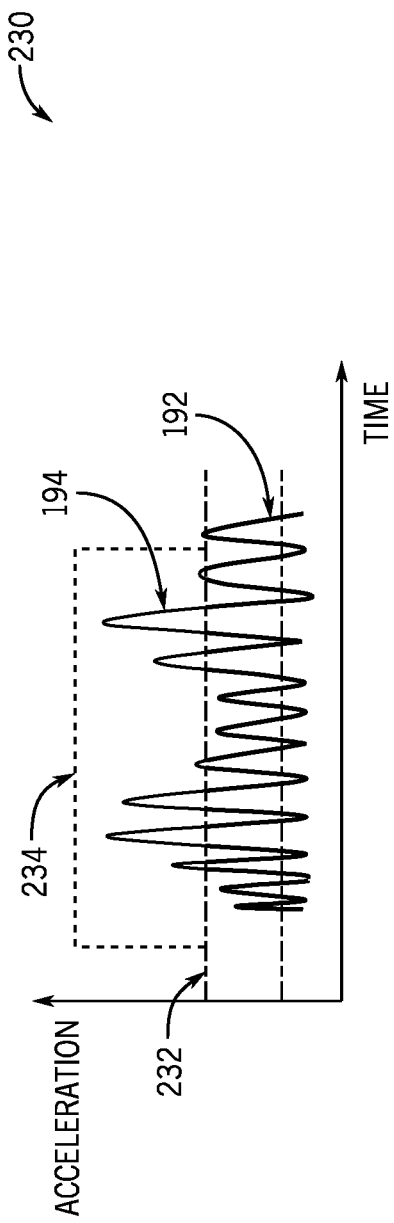
FIG. 15 illustrates a graph representative of combined signals, in accordance with embodiments described herein.

Since each accelerometer 152 and 154 may have ranges of more accurate measurements, the amplitude calibration may be valid in certain amplitude ranges. For example, the signal 192 may be saturated at certain threshold (e.g., 100 mg, as shown in FIG. 14). Therefore, at block 186, the processing system 50 may combine the normalized set of motion data with the second set of motion data as shown in graph 230 of FIG. 15. That is, above a threshold 232, the signal 194 may be selected to substitute the signal 192 (e.g., within a substitution window 234). However, below the threshold 232, the calibrated signal 192 is kept for later usage such as data merging and processing. As a result of performing the method 170 described above, the signals received from the accelerometers 152 and 154 may be performed in both a time domain (e.g., synchronization) and an amplitude domain (e.g., calibration or normalization).

Time Synchronization of Local Communication Components in Seismic Data Acquisition System As discussed above, seismic waves created with artificial sources (e.g., dynamite or vibroseis) may be reflected or refracted from subsurface formations due to acoustic-impedance contrasts or high-velocity members. In practice, observing the arrival times of the reflected/refracted waves corresponds to measuring ground motions (e.g., displacements, velocities, or accelerations). Ground motions may be measured through seismic sensors, such as geophones and accelerometers, as discussed above. In some embodiments, cable-based seismic acquisition systems have been widely used in seismic surveys. For example, land seismic data acquisitions involve using various digital or analog cables (e.g., cables containing hundreds or thousands of seismic sensors that may stretch up to 6 to 10 kilometers). However, cable-based seismic data acquisition systems often pose challenges to seismic acquisition crews in complex terrains (e.g., mountain, forest, and swamp areas) or other access-limited areas (e.g., oil production fields), where the cable-based systems may have difficulties to cross.

Nodal seismic acquisition systems, on the other hand, may be utilized to acquire seismic data in such access-limited areas where using cable-based systems may be difficult or prohibited. A nodal seismic acquisition system may be referred to as an acquisition system utilizing seismic sensing instrumentation without integrating cables.

In a nodal seismic acquisition system, each node may encapsulate a sensing unit (including sensors such as geophones or accelerometers), a recording unit (including electric devices such as processors, control circuits, AD converter, filters, and memory devices), and a power unit (e.g., batteries). In addition, each node may include a time reference device (e.g., clock) and wireless communication devices (e.g., transmitter, receiver, and antenna). Using an accurate time reference for time synchronization may be very useful as the primary objective of a seismic survey relates to observing the arrival times of the seismic wave. In field operations, however, nodes with uncorrelated local clocks (e.g., oscillators) may experience variable clock drifts related to the oscillator stability and accuracy over time.

As such, to synchronize time at various nodes, a time reference provided by Global Navigation Satellite System (GNSS) may be used to keep the time-domain data sampling accuracy after node deployment. For instance, the GNSS time reference may be used to synchronize the local clocks of deployed nodes. The time accuracy for seismic data acquisition synchronization may be achieved in microsecond order. However, local clocks (e.g., oscillators) used in the seismic application sensors may exhibit offset and drift due to temperature variations experienced by the sensors and aging of the sensors. Such effects may increase time-domain measurement uncertainties and may cause a loss of synchronization in later data processing of acquired seismic data if the local clock synchronization to the time reference provided by GNSS is lost or unreliable. For example, high latitudes regions (e.g., closer to geographical South and North poles) may have less satellite density and coverage, as compared to regions close to the equator. In addition, establishing reliable synchronization with satellites may prove to be challenging due to weather conditions. In some cases, reliable synchronization may be difficult in light of a decreased signal strength issue due to natural humidity or natural obstacles (e.g., trees).

Moreover, GNSS receivers may have increased power consumption as they use amplification stages to increase signal strength due to low signal strength. That is, during the GNSS receiver activities, the internal heating caused by power dissipation may downgrade measurement precision due to a pyroelectric effect in the sensing units. As such, certain methods, such as initial synchronization of each node with a clock reference prior to deployment and after each node recovery, may be used to compensate synchronization errors due to missing GNSS signal. However, such methods may not provide sufficient compensation for extended acquisition time without receiving GNSS synchronizations on a regular basis.

Keeping the foregoing in mind, in certain embodiments as described herein, a time synchronization method using local wireless communication in distributed seismic data acquisition systems (e.g. nodal systems) is provided. Such methods may provide inter-node and node-to-base communications for time synchronization operations for use after deployment of nodal seismic data acquisition systems in field surveys. The disclosed method may, in some embodiments include using a radio communication module in each node of a nodal seismic data acquisition system. That is, the radio communication module may perform a time synchronization operation between multiple independent nodes and a base station (e.g., field cabin) using a time reference received via a real-time communication signal. The time reference may be generated from a clock-reference source (e.g., atomic clock) on the base station. Using this local time synchronization operation, the nodes in the seismic data acquisition system may remain synchronized with respect to time without receiving regular GNSS synchronizations.

With this in mind, FIG. 16 illustrates an example seismic acquisition system 240 that may include multiple acquisition nodes or node devices 242, which may implement time synchronization techniques described herein. The node device 242 may correspond to land-based sensors 74 as described above. As such, the node devices 242 may receive seismic data (e.g., reflections) representative of geological features of a subsurface region of the earth.

As shown in FIG. 16, multiple node devices 242 may be deployed to form seismic acquisition grids (or networks). The grid sizes may be predefined during a survey design. Local positioning adjustments may be applied according to terrain conditions and/or obstacles encountered. As a result, the node devices 242 create a nodal system that may be used in complex areas and may be more useful or flexible, as compared to a cable-based system.

In some embodiments, the node devices 242 may be communicatively coupled to a base station 244, which may include a reference clock 246 and a communication component 248. The base station 244 may be located a threshold distance away from any of the node devices 242 and may collect or receive data acquired by the node devices 242. The base station 244 (e.g., field cabins) may provide centralized survey control, real-time data quality control (QC), node data harvesting and storage, reference clock for data synchronization (e.g., atomic clock or other devices that may provide accurate time reference), pre-processing data, and other support operations for the seismic survey. As such, the base station 244 may send reference clock signals to the node devices 242 via the communication component 248. The reference clock signals may be representative of time stamps times as provided by the reference clock 246.

The communication component 248 may facilitate a wired or wireless communication between the base station 244 and the node devices 242. As such, the communication component 248 may correspond to the communication component 52 described above. Indeed, the communication component 248 may transmit and receive communication signals to and from the node devices 242 based on any suitable communication protocol, such as LoRaWAN, Sigfox, BLEmesh, NB-loTBluetooth, WiFi, ZigBee, and the like. Additional network layers may also be used and depending on the implemented protocol.

Each node device 242 may include a number of components, examples of which are illustrated in FIG. 17. Referring to FIG. 17, the node device 242 may include one or more seismic sensors 250, a communication component 252, one or more antennas 254, one or more processors 256 or processing systems, a storage component 258, a clock 260, a power supply 262, and the like. The seismic sensor 250 may include any suitable acoustic or seismic data acquisition device, such as an accelerometer, geophone, or the like. The communication component 252 may correspond to the communication component 248 and 52 described above. The communication component 252 may receive and transmit data via one or more antennas 254. In one embodiment, the communication component 248 may include a radio communication module.

The processor 256 may correspond to the processor 54 described above. The processor 256 may also include recording devices, control circuits, an analog-to-digital converter, and other signal conditioning circuitry. The storage component 258 may include any suitable memory or storage that may include computer-executable instructions that may be executed by the processor 256 or any suitable computing device to perform the embodiments described herein. As such, the storage 258 may correspond to the memory 56 and/or the storage 58 described above.

The node device 242 may also include a local clock 260, which may include an oscillator or the like. With this in mind, the time synchronization between individual node devices 242, and the time synchronization between the node device 242 and the base station 244 may be performed using the communication components 248 and 252 based on real-time wireless communications. Such a method may enable inter-node and node-to-base communications to be time-synchronized after deployment of the nodal seismic data acquisition system in a field survey.

The node device 242 may also include a power supply 262. The power supply 262 may include a continuous source of voltage, a battery, a power harvesting device, or any other suitable power source.

With the forgoing in mind, further details for time-synchronizing the inter-node and node-to-base communications are provided below. The time synchronization method disclosed herein may include enablement of a number of functionalities using wireless communication in a nodal seismic data acquisition system including time synchronization with order of microsecond precision; sensor positioning based on specific network topology (e.g., multi-base-station topology allowing triangulation); and lost asset (e.g., acquisition node) recovery. The use of the communication components 248 and 252 may enable digital wireless communication between the node devices 242 or between each node device 242 and a single base station 244 or multiple base stations.

Figure 18:
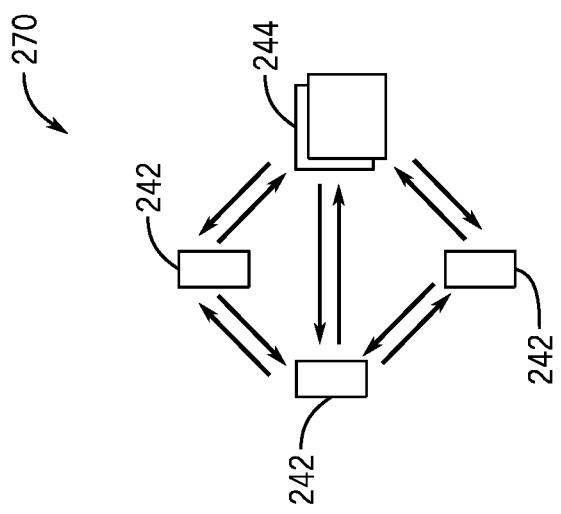
FIG. 18 illustrates an example communication scheme between node devices and a base station, in accordance with embodiments described herein.

By way of example, FIG. 18 illustrates a schematic diagram of a nodal seismic data acquisition system 270 with node devices 242 and base stations 244 that communicate with each other. That is, the node devices 242 and base stations 244 may be communicatively linked to form a wireless communication network. A distributed network configuration is used as an example in the illustrated embodiment. Arrows denote wireless communication links. In some embodiments, the wireless communication network may use multiple base stations 244 when one base station 244 has insufficient bandwidth or range to cover enough remote node devices 242. Different network topologies (e.g., mesh, start, or ring) may be implemented. Additional deployment of base station(s) 244 may depend on actual network architecture (e.g., centralized or decentralized) and position definition via network topology.

As mentioned above, time synchronization may be achieved through calculation of delays caused by specific protocol implementation through comparison between a local clock 260 (e.g., oscillator in the node device 242) and a remote clock 248 (e.g., atomic clock in the base station 244). Such calculation and comparison may be performed by the processors 256 on each node device 242. The processors 256 on each node device 242 may use computational routines stored in the storage 258 or the like. For example, the time synchronization may use protocols similar to those implemented in Network Time Protocol (NTP) designed for server time correction based on a remote precise clock source. The linked node devices 242 in a network (e.g., the distributed network shown in FIG. 18) may use the same communication modules, and, as such, the delays in the protocol processing are similar. As a result, the clock synchronization with an accuracy in microsecond level may be achieved. The base station 244 may use different reference clock sources, such as an independent atomic clock source, or may be synchronized via GNSS. For example, the base stations 244 may have less restricted power dissipation limits as compared to node devices 242 using battery power. As such, the base station may implement more powerful GNSS receivers with better sensitivity and using external higher-grade antennas.

Figure 19:
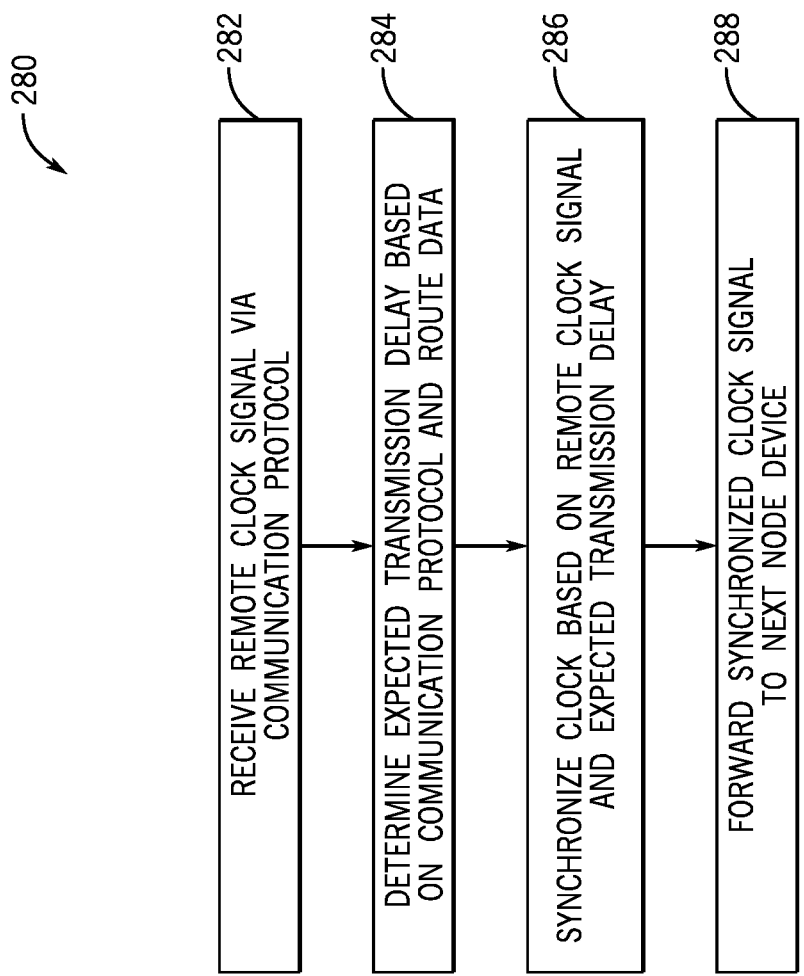
FIG. 19 illustrates a flow chart of a method for synchronizing time signals received at a node device in the example node seismic acquisition system of FIG. 16, in accordance with embodiments described herein.

With the foregoing in mind, FIG. 19 illustrates a method 280 for synchronizing the clock 260 of the node device 242.

As such, the following description of the method 280 is described as being performed by the processor 256 of the node device 242. However, it should be understood that any suitable processing device may perform the method 280. In addition, although the following description of the method 280 is detailed in a particular order, it should be noted that the method 280 may be performed in any suitable order.

Referring now to FIG. 19, at block 282, the processor 256 may receive a remote clock signal via the communication component 252. The remote clock signal may be transmitted via a particular communication protocol from the base station 244 or another node device 242. The remote clock signal may represent a clock value of the clock 246 of the base station 244. As such, the processor 256 may receive the remote clock signal directly from the base station 244 or via one or more other node devices 242.

At block 284, the processor 256 may determine an expected transmission delay based on the communication protocol in which the remote clock signal was received and route data associated with a source of the remote clock signal. The route data may indicate the component that transmitted the remote clock signal. As such, the processor 256 may determine the expected delay in transmission or the difference between the received remote clock signal and the actual remote clock signal based on the communication protocol used to transmit the remote clock signal and/or the specific device that transmitted the signal.

Based on the received remote clock signal and the expected transmission delay determined at block 284, the processor 256 may proceed to block 286 and synchronize the local clock 260. That is, the processor 256 may apply the expected transmission delay to the received remote clock signal, thereby determining a local clock signal that is in sync with the remote clock signal.

At block 288, the processor 256 may forward the synchronized clock signal to another node device 242. In this way, the node devices 242 in the nodal seismic data acquisition system 270 or other network of node devices 242 may be synchronized.

The advantages of local time synchronization described above over other GNSS time synchronization methods may include, but are not limited to the following: consistent and reliable operation functionality in various geographic locations, independence of the latitude; less susceptibility to weather conditions (clouds or storms) as terrestrial communication units are used; less sensitivity to natural humidity or natural obstacles (e.g., trees) due to possibility of adaptive power control for some protocols; lower power consumption on the acquisition node level; and reduced internal heating and improved measurements stability as a result of less heating generated during operation.

In some embodiments, additional features may be enabled by implementing bi-directional communication protocols for time synchronization. For example, using a wireless communication network as shown in FIG. 18, real-time data monitoring may be achieved through periodic data transfer or inquiries performed by the base stations 244. The monitored data may include seismic data acquired by node devices 242, remaining node battery life, events (e.g., a system-element failure or actual data samples or their deviations), and other relevant information. In certain embodiments, data compression techniques may be used to reduce data flow and use available bandwidth efficiently.

Each remotely deployed node device 242 may be controlled by commands sent from a base station 244 and passed through a wireless communication network (e.g., the distributed network shown in FIG. 18). These commands may include acquisition starting and stopping times, switching to or exiting from low-power modes, different acquisition parameter reconfiguration (such as system gain or sampling frequency), and other relevant survey or equipment control instructions.

In some embodiments, an asset tracking operation may be performed to identify acquisition nodes availability using the wireless communication network of FIG. 18. The asset tracking capability may help the process of acquisition node transportation or inventory inspection. For example, acquisition nodes may be periodically retrieved and transported back to base station 244 for data harvesting, battery recharging, and maintenance. The asset tracking operation may use certain construction of a shipping container (e.g., a wooden or plastic crates) that allows radio-wave propagation.

Additionally, lost asset recovery may be performed using the wireless communication network (e.g., the distributed network shown in FIG. 18). For example, when the node device 242 failed to be detected by a conventional method (e.g., detected by a surveyor), an identification of the node position may be requested by an operator in a base station 244. In some cases, the node device 242 may be covered by different types of materials, such as snow or sand, so that transmitted or received signals may not be sufficiently strong to be transmitted or received. In such situations, an approximate surveying operation may be performed around the node device 242 using signal strength measurements. After an approximate node position is identified, a localization operation may be applied using triangulation. The localization operation may be performed by the processors 256 on the node devices 242 involved in the approximate surveying operation.

Figure 20:
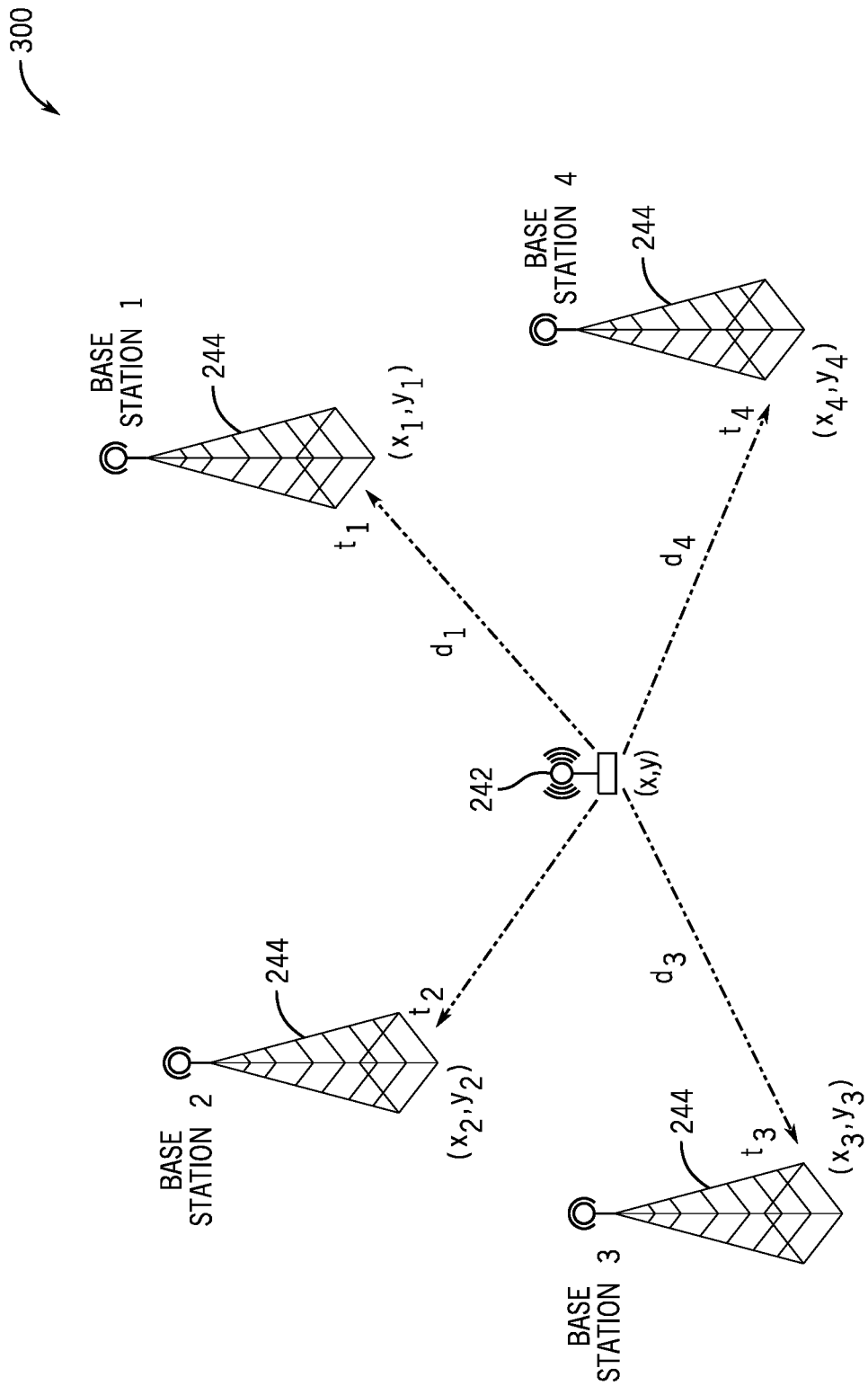
FIG. 20 illustrates an example communication scheme between node devices and multiple base stations, in accordance with embodiments described herein.

In certain embodiments, acquisition node positioning and localization may be achieved using triangulation techniques by calculating delays of data transmission to several base stations with known coordinates acquired (e.g., using GNSS or the like). For example, FIG. 20 illustrates a communication system 300 that includes a number of base stations 244. The calculation may use coordinates of the base stations (e.g., $(x_1, y_1)$ of base station 1, $(x_2, y_2)$ of base station 2, and such, distances between an acquisition node and the base stations (e.g., $d_1$, $d_2$, $d_3$, and $d_4$), and travel times from the acquisition node to the base stations (e.g., $t_1$, $t_2$, $t_3$, and $t_4$). Such calculation may be performed by the processor 256 as described above. In some embodiments, multiple base stations 244 may be involved for acquisition node localization using a method of triangulation. The achieved precision may be comparable to GNSS method depending on the network architecture implementation. Such factors as the number of base stations, the base station positioning, and the available bandwidth may define the achievable precision.

With the functionalities described in present embodiments, a GNSS-less time synchronization method using local wireless communication in nodal seismic acquisition system may provide a centralized time synchronization mechanism with precise control of individual acquisition node clock adjustment to replace GNSS-based time synchronization methods. For example, a time synchronization with order of microsecond precision may be achieved using the disclosed method. Such a method may be implemented by equipping each acquisition node with a communication module that enables digital wireless communication using radio frequencies. Acquisition node positioning and localization may also be achieved using a wireless communication network with multiple base stations using triangulation technique as shown in FIG. 20. Real-time data monitoring to identify faulty acquisition nodes may also be achieved using the wireless communication network. Remote and real-time acquisition node control may be performed to improve useful time so that acquisition nodes may operate with extended time on a single battery charge or before filling up the node memory. Enabled asset tracking capability with quick and accurate identification of acquisition nodes (e.g., locations, and inventory parameters) may eliminate sending surveyors for physical verifications. Additionally, lost asset recovery capability may be used to accelerate the lost asset search time and improve the recovery rate.

Mesh Networks in Nodal Seismic Acquisition Systems

As mentioned above, cable-based seismic acquisition systems may create operational and logistics burdens to seismic acquisition crews. For example, land seismic survey industry is known for using heavy and cumbersome cables. Lengthy cables are easily damaged due to natural or cultural causes, and connectors may wear out. Cable-based seismic data acquisition systems often pose challenges to seismic acquisition crews in complex terrains (e.g., mountain, forest, and swamp areas) or other access-limited areas (e.g., oil production fields), where the cable-based systems may be difficult to install. Nodal seismic acquisition systems, on the other hand, may be utilized to acquire seismic data in such access-limited areas where using cable-based systems is difficult or prohibited. For example, ocean bottom node (OBN) systems have been used in areas like Gulf of Mexico.

Referring back to the seismic acquisition system 240, each node device 242 may encapsulate a sensing unit (e.g., seismic sensors 250 such as geophones, accelerometers, or hydrophones), a recording unit (e.g., processor 256, control circuits, analog to digital (A/D) converters, filters, and memory devices), the power supply 262 (e.g., batteries), the clock 260, and the like. For node devices 242, wireless communication devices (e.g., transmitter, receiver, and antenna) may also be included. Unlike the cable-based acquisition systems where the sensing and recording units are powered via cables, node devices 242, in some embodiments, may operate on battery power. As such, power consumption thresholds may inhibit certain functionalities of the node device 242. For example, the node device 242 may send more than a threshold amount of data using the communication component 252 in real-time to a remote base station 244 and the transmission may involve more than a desired amount of power consumption. As a result, the transmission for the data may be suspended when the node device 242 is operating in an acquisition mode (e.g., receiving seismic wave or reflection data).

Keeping the foregoing in mind, in certain embodiments as described herein, a nodal seismic acquisition system may employ a low power consumption wireless network. The low power consumption wireless network may provide communications across sparsely separated seismic acquisition nodes (e.g., node devices 242). For example, the low power wireless network may allow a group of seismic acquisition nodes to be communicatively connected to each other to form a mesh type network. This mesh type of network may allow data transmission from one node to neighboring nodes, and then by successive reception and transmission, from one side of the mesh network to the other side. A mesh network in the context of seismic acquisition may allow for a variety of services and features, which will be discussed later.

Additionally, the nodal seismic acquisition system, as described herein, may use the mesh network along with acquisition check nodes to gauge a spread of seismic nodes in real time. That is, an acquisition check node may communicate with a group of node devices 242 to collect and preprocess data, such as seismic data samples, acquisition node hardware information, and the like. The collected and preprocessed data may be used for the purpose of checking acquisition correctness in nodal spread and node health. The spread may be referred to as a geometrical pattern of groups of seismic nodes relative to a seismic source. For example, the seismic waves excited by a single shot may be recorded simultaneously by the spread during a seismic acquisition operation. The addition of acquisition check nodes may allow the spread to be monitored and modified based on changing conditions occurring during the seismic acquisition operation.

Figure 21:
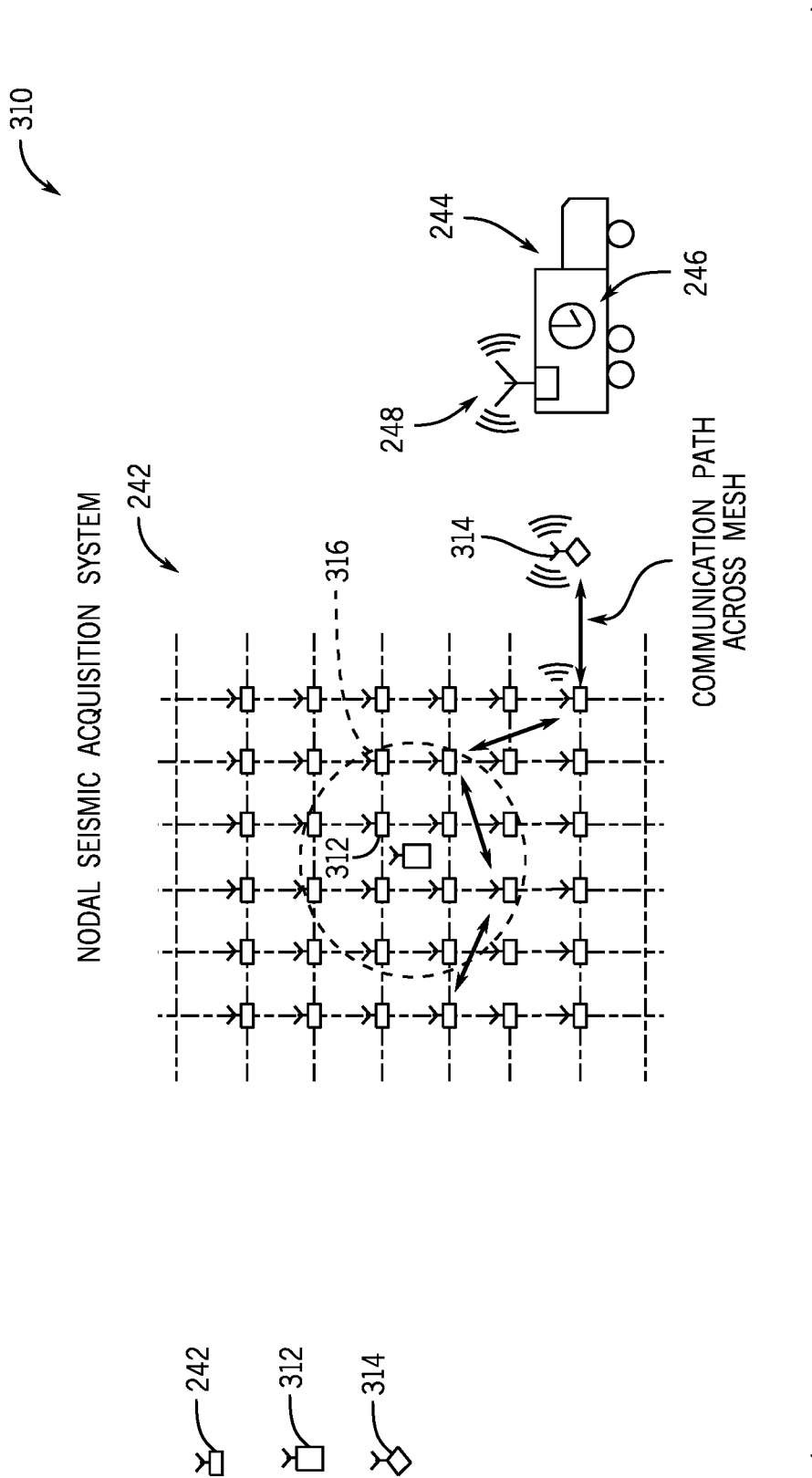
FIG. 21 illustrates an example mesh network communication scheme between node devices and a base station, in accordance with embodiments described herein.

With the foregoing in mind, FIG. 21 illustrates an example mesh network communication system 310 between node devices 242 and a base station 244, in accordance with embodiments described herein. As shown in FIG. 21, multiple node devices 242 may be deployed to form a seismic acquisition grid (e.g., a mesh type network). The grid sizes may be predefined during survey design. Local positioning adjustments may be applied according to terrain conditions and/or obstacles encountered. As a result, using the nodal system in complex areas may be more useful or flexible, as compared to cable-based system.

By way of operation, the node devices 242 may collect seismic data using the seismic sensors 250 and may process or pre-process the acquired seismic data using the processor 256. In some embodiments, the processor 256 may be initialized with job-related parameters, such as sample interval, gain, and filter setting, which may be applied to the acquired seismic data. The initialization process may involve receiving a command from the base station 244 or other suitable computing device to start data acquisition via the seismic sensors 250. In some cases, the node devices 242 that receive the command may start acquiring data even though there are remaining node devices 242 to be deployed.

Seismic measurements are often performed during daylight hours. However, during the night-time hours when controlled seismic sources are not activated, the node devices 242 may continue acquiring unwanted data (e.g., ground noise), which may cause the storage 258 to become filled with unwanted data. As such, the commands received by the node devices 242 may coordinate time intervals in which the node devices 242 acquire seismic data, send data, and perform other operations. For example, at the end of a survey or at the end of each data acquisition cycle during the survey, the node devices 242, in some embodiments, may be physically collected, gathered, and sent to the base station 244 (e.g., field cabin) for data harvesting/dumping and refurbishing. However, by controlling the time intervals in which the node devices 242 acquire seismic data, the unwanted data collected by the node devices 242 may be omitted from the storage 258, thereby reducing burdens and costs associated with harvesting and processing the data afterwards.

In some embodiments, the node devices 242 may operate autonomously during a seismic survey. That is, the node devices 242 may record seismic measurements continuously over a predefined period of time or until their power sources expire. In the course of land seismic operations, the node devices 242 may be initialized or preprogrammed with job-related parameters (e.g., sample interval, gain, filter setting, and the like), and then deployed by a field crew to specific locations based on a seismic survey design map. As mentioned above, the node devices 242 may be activated remotely (e.g., by taking commands from the base stations 244, field cabins, or other control units) or locally (e.g., by executing on-board routines stored in memory devices).

After receiving activation commands, the node devices 242 may use the seismic sensors 250 (e.g., geophones, accelerometers, or other suitable devices) to start acquiring data by measuring ground motions (e.g., velocities or accelerations) excited by seismic waves, which were initiated by seismic sources (e.g., dynamite, vibrators, or other suitable devices that may generate controlled seismic energy).

In some embodiments, each node device 242 may transmit the acquired seismic data to the base station 244, a check node 312, a repeater node 314, or another node device 242. That is, each node device 242 may be capable of communicating with neighboring node devices 242 via wireless communications using the communication component 252. Such node-to-node communication may have a limited range for power conservation. A group of communicatively connected node devices 242 may form a network to provide communications across sparsely separated seismic acquisition nodes. For example, as shown in FIG. 21, the mesh network system 310 may be formed using the node devices 242 from the acquisition grids. This mesh type of network allows data transmission from one node device 242 to neighboring node devices 242 and then by successive reception and transmission from one side of the mesh network system 310 to the other side until a destination (e.g., base station 244, field cabin) is reached. The use of the mesh network system 310 may reduce the data transmission between node devices 242 and the base station 244 (e.g., through the node-to-cabin communication). As such, power consumption related to data transmission using wireless communication may be reduced. The reduced power consumption may enable a low power consumption wireless network as compared to the other networks without using a mesh type network topology.

The base station 244 or a field cabin, which may be a type of mobile base station, may be used by seismic operators to control and monitor seismic data acquisition operations. One or more field cabins may be used to provide centralized survey control, real-time data quality control (QC), node data harvesting and storage, reference clock for data synchronization (e.g., GNSS clock, atomic clock, or other devices that may provide accurate time reference), preprocessing data, and other supports for seismic survey. The base station 244 or the field cabin may communicate with node devices 242 via wireless communications directly (e.g., node-to-cabin communication) or indirectly. For example, the base station 244 may obtain sample data acquired by the node devices 242 or specific information (e.g., location, battery life, or inventory information) via certain intermediate node devices 242, such as the check nodes 312.

In some embodiments, the check node 312 may be used to communicate with a number of the node devices 242 within a threshold distance 316. The check node 312 may correspond to any suitable computing device and may include components listed in the processing system 50. As such, the check node 312 may collect and preprocess data (e.g., seismic data samples, acquisition node hardware information, and other survey related information) for the purpose of checking acquisition correctness in nodal spread and node health. For example, the check node 312 may collect seismic data samples acquired by a group of acquisition node devices 242 corresponding to a selected shot (i.e., a spread). The collected seismic data samples may be preprocessed (e.g., signal-to-noise ratio (SNR) analysis, filtering, and brute stack) by the check node 312 to check data quality of the spread.

The check node 312 may be accessed by the base station 244 or other computing devices to retrieve the preprocessed data. After data retrieval, the acquisition check node 312 may be redeployed to same position as previous deployment (e.g., for re-collecting data if previously collected data is invalid) or to a different position (e.g., for collecting data from another group of node devices 242). Additionally, or alternatively, at least a portion of the preprocessed data may be transmitted to the base station 244 or a field cabin via wireless communication directly (e.g., check-node-to-cabin communication), or through the mesh network system 310. The survey operator may adjust certain data acquisition operations based on the received preprocessed data. For example, an instruction may be transmitted via the mesh network system 310 to the node devices 242 to change certain settings (e.g., gain factor) of the seismic sensors and filter parameters to improve the signal-to-noise ratio.

The acquisition check node 312 may include wireless communication devices (e.g., receiver, transmitter, and antenna) to provide node-to-check-node communication. The node-to-check-node communication range may be greater than the node-to-node communication range of the node devices 242. The use of acquisition check node 312 may reduce the amount of data being transmitted between the acquisition node devices 242 and the base station 244 or the field cabin (e.g., through the node-to-cabin communication or the mesh network). As such, power consumption related to data transmission using wireless communication may be reduced. The reduced power consumption may further enable the low power consumption wireless network.

The mesh network system 310 may also include the repeater node 314 that may be used to allow the acquisition node devices 242 or the check node 312 to communicate with the base station 244 or a field cabin that may be located outside the node-to-base communication range. For example, the base station 244 or the field cabin may communicate across the mesh network system 310 to a specific acquisition node device 242 in the spread. The repeater node 314 may allow a communication over a greater distance than the node devices 242 or the check nodes 312 can communicate via the mesh network system 310. The use of the repeater node 314 may also reduce the amount of data being transmitted between the node devices 242 and the base station 244 or the field cabin (e.g., through the node-to-cabin communication or the mesh network). As such, power consumption related to transmitting data using wireless communication may be reduced. The reduced power consumption may further enable the low power consumption wireless network.

With the forgoing in mind, the mesh type network system 310, combined with the use of acquisition check nodes 312 and the repeater nodes 314, may enable a land nodal seismic acquisition system with a low power consumption wireless network. The low power consumption wireless network may provide communications across a group of sparsely separated seismic acquisition nodes. Communication signals transmitted through the low power consumption wireless network may be based on protocols such as LoRaWAN, Sigfox, BLEmesh, NB-loTBluetooth, WiFi, ZigBee or other suitable protocols that may be used for wireless communications. Additional network layers may be used and may depend on implemented protocol.

Figure 22:
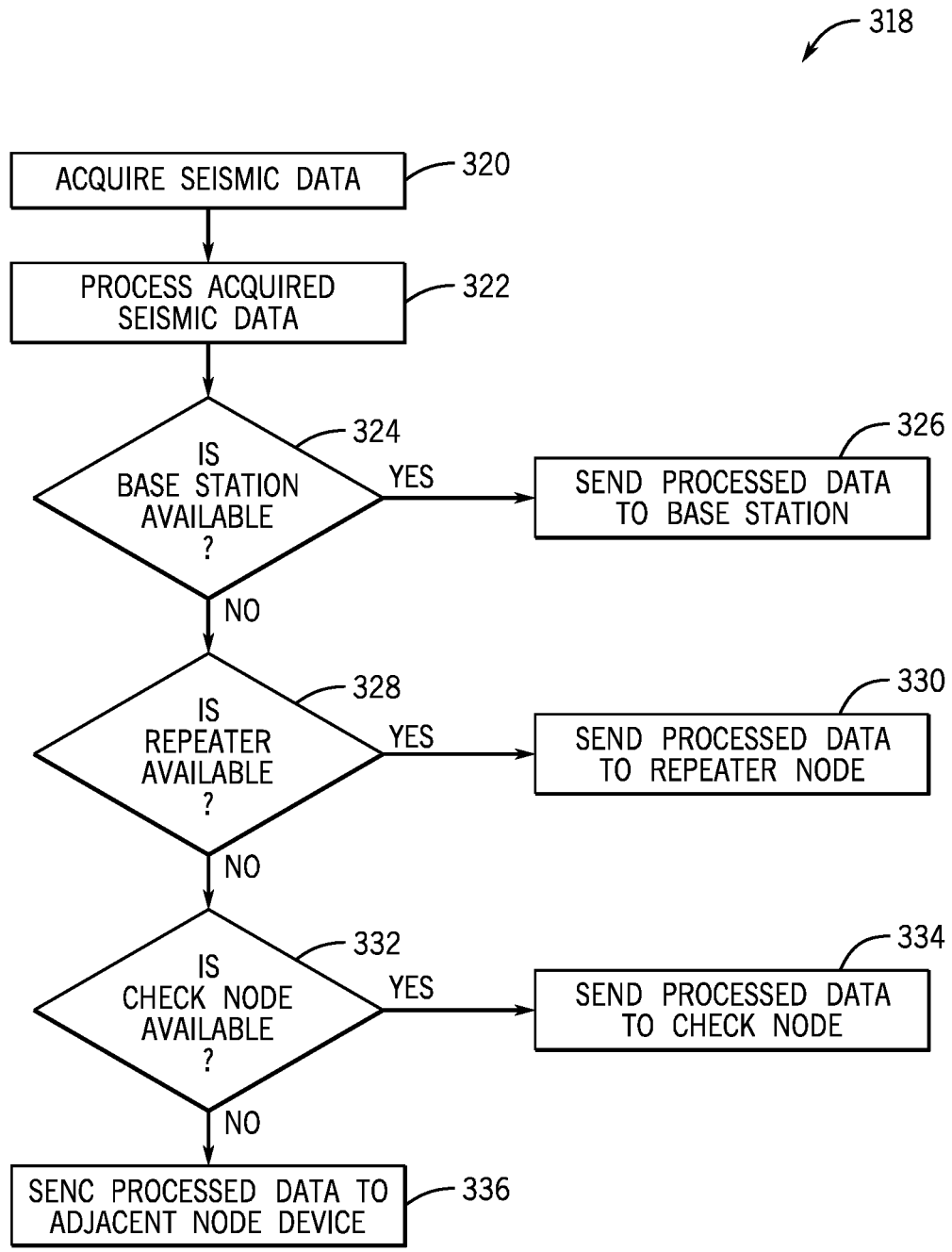
FIG. 22 illustrates a flow chart of a method for communicative data within the mesh network communication scheme of FIG. 21, in accordance with embodiments described herein.

Keeping this in mind, FIG. 22 illustrates a flow chart of a method 318 for communicative data within the mesh network communication system 310 of FIG. 21, in accordance with embodiments described herein. Although the method 318 is described as being performed by the node device 242 and in particular order, it should be noted that the method 318 may be performed in any suitable order. Indeed, the method 318 may be performed by the repeater node 314 or the check node 312.

Referring now to FIG. 22, at block 320, the node device 242 may receive seismic data acquired by the seismic sensor 250. The seismic data may include the reflected data described above with reference to FIGS. 1 and 2. After acquiring the seismic data, the node device 242 may process the acquired seismic data at block 322. As such, the node device 242 may perform filtering operations, gain operations, and other signal processing operations. For example, in one embodiment, the node device 242 may process the acquired data in accordance with the method 170 described above.

At block 324, the node device 242 may determine whether the base station 244 or the field station is available. That is, the node device 242 may broadcast a signal to determine whether the base station 244 is available within a communication range of the node device 242. If the node device 242 receives a response message from the base station 244, the node device 242 may determine that the base station 244 is present and may proceed to block 326. At block 326, the node device 242 may send the processed data to the base station 244.

If the node device 242 does not receive the response message from the base station 244, the node device 242 may proceed to block 328. At block 328, the node device 242 may determine whether the repeater node 314 is available. That is, the node device 242 may broadcast a signal to determine whether the repeater node 314 is available within a communication range of the node device 242. If the node device 242 receives a response message from the repeater node 314, the node device 242 may determine that the repeater node 314 is present and may proceed to block 330. At block 330, the node device 242 may send the processed data to the repeater node 314.

If the node device 242 does not receive the response message from the repeater node 314 at block 328, the node device 242 may proceed to block 332. At block 332, the node device 242 may determine whether the check node 312 is available. That is, the node device 242 may broadcast a signal to determine whether the check node 312 is available within a communication range of the node device 242. If the node device 242 receives a response message from the check node 312, the node device 242 may determine that the check node 312 is present and may proceed to block 334. At block 334, the node device 242 may send the processed data to the check node 312.

If the node device 242 does not receive the response message from the check node 312 at block 332, the node device 242 may proceed to block 336. At block 336, the node device 242 send the processed data to an adjacent node device 242 in the mesh network system 310. The adjacent node device 242 may then perform the method 318 described above. This process may continue until the base station 244, the repeater node 314, the check node 312, or other suitable receiving device receives the processed data. By limiting the communication of the node devices 242 to a particular threshold distance, the node devices 242 may limit power used in communicating data.

Additional features may be provided by communicating data between components via the mesh network system 310 described above, thereby providing a low power consumption wireless network. For example, in some embodiments, the node device 242 may implement a calendar mode replacement procedure that may specify dates in which certain components should be replaced. In addition, the node devices 242 may be individually initialized with a set of job-related parameters (such as acquisition mode, acquisition time window, and data compression mode) at the time of deployment. For example, one of the job-related parameters may allow for the node devices 242 to be switched on or off according to a preset time schedule. Such feature may allow for more efficient use of the batteries and memory devices on each node device 242.

Using the mesh network system 310, the node device 242 may be programmed to be "on" or "off" in real-time. For example, when some unexpected events occur (e.g., bad weather condition, human or animal interruption), at least a portion of the node devices 242 may be programmed to turn "off" to avoid acquiring unwanted data. The benefits associated with this mode of operation may include, but are not limited to, implementing a timing schedule that may not be known at the time of node deployment; making a decision regarding when to switch on or off the node device 242 after node deployment; and scheduling a time for switching acquisition to be "on" or "off" may be programmed in real-time for different areas of an acquisition spread. The ability to customize the acquisition schedules in real-time may allow valuable acquisition data and memory to be saved. As a result, the time for harvesting the acquired data from the node devices 242 may be reduced. Additionally, the power consumption due to acquiring unwanted data may be reduced.

In some embodiments, different acquisition modes may be applied to node devices 242 in a real-time manner using the mesh network system 310. For example, an acquisition mode that may only allow high gravitational events (e.g., accelerations measured in 0.1 g or 1 g level, where g is gravitational constant, 1 g=9.81 m/s$^2$) to be captured during ground motion measurement. Such acquisition mode may be enabled with or without the GPS location depending on defined parameters for event tracking.

In certain embodiments, a node status confirmation may be achieved using the mesh network system 310. For example, an operator in a field cabin may issue commands, via the mesh network system 310 using wireless communication, to all node devices 242 in an acquisition spread, a specific group of node devices 242 (e.g., along one inline or crossline), or a specific node device 242. Such commands might include the request of node status information, such as acquisition state (off/on), memory usage, battery usage, environmental and baseline noise levels, current location from GPS, differential location (difference between original deployment and current deployment), inclination of the device, sensor hardware status, and other relevant information. Such information may help the operator to determine the health of the acquisition spread and whether the acquisition nodes in the acquisition spread should be visited for adjustment or replacement. Moreover, the information for any particular node device 242 may be transmitted using the method 318 described above to efficiently forward data across the mesh network system 310 with minimal power.

In some embodiments, a node data query may be conducted using the mesh network system 310. That is, a directed command, issued by an operator or by a preset computer routine, may be used to retrieve acquisition data corresponding to a particular shot (e.g., shot fired at a specific location and/or at a specific time). For example, a packet of acquisition data (e.g., in the order of 30 to 60 seconds) may be transported across the mesh network system 310 to a receiving device situated with an operator.

Certain data quality related information (e.g., acquisition waveforms) may be derived in real-time for data quality control (QC) by the operator.

Using the mesh network system 310, an acquisition node inventory query may also be conducted. For example, when an acquisition spread is deployed, the node devices 242 may be interrogated via the mesh network system 310 for retrieving certain inventory data (e.g., serial numbers of the acquisition nodes). Cyclically or on demand inventory query may allow the operator to obtain certain equipment-related information (e.g., locations of the node devices 242). Similarly, when harvesting the data from node devices 242, the mesh network system 310 may be used to determine which node devices 242 are currently on the base station 244. The mesh network system 310 may be programmed with each individual data acquisition operation in the harvesting process. Such features may allow a full automation of the harvesting process, including node device 242 retrieving, washing, harvesting, and/or preparation for redeployment.

During a field seismic data acquisition process, node handling after the node device 242 has left manufacturing facilities may affect the node performance and ultimately the life of the node device 242. With this in mind, the mesh network system 310 may allow a monitoring of the node devices 242 during transportations among a variety of facilities or locations (e.g., storage facilities, harvesting facilities, or deployment locations). With the variety of services and features enabled by the mesh network system 310 with a low power consumption wireless network described above, operational flexibility and process automation may be achieved to reduce the operating and processing time, therefore increasing operational value with reduced operational expense.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A sensor package, comprising:
a sensor housing unit;
a first accelerometer sensor configured to acquire a first set of measurements associated with a ground roll of seismic energy detected within a first measurement range of the first accelerometer sensor, the first accelerometer sensor having a first accuracy property, a first resolution, and a first calibration stability associated with an amount of time; and
a second accelerometer sensor configured to acquire a second set of measurements associated with the ground roll within a second measurement range of the second accelerometer sensor, wherein the second measurement range includes a higher measurement value as compared to a greatest measurement value within the first measurement range, the second accelerometer sensor being a different type of accelerometer sensor as compared to the first accelerometer sensor and having:
a second accuracy property greater than the first accuracy property,
a second resolution lower than the first resolution; and
a second calibration stability greater than the first calibration stability, wherein the first measurement range and the second measurement range comprise an overlapping range used to automatically calibrate the first set of measurements at a periodic frequency, wherein the first set of measurements is automatically calibrated with respect to the second set of measurements based on a first portion of the first set of measurements and a second portion of the second set of measurements, wherein the first portion and the second portion are within the overlapping range; and
a processing system configured to obtain a third set of measurements having a third resolution higher than the second resolution by applying a gain to the second set of measurements based on automatically calibrating the first set of measurements, wherein the third set of measurements is within the first measurement range and corresponds to a saturation region of the first accelerometer sensor.

2. The sensor package of claim 1, wherein the first accelerometer sensor comprises a piezoelectric accelerometer.

3. The sensor package of claim 1, wherein the second accelerometer sensor comprises a Micro-Electro Mechanical Systems (MEMS) accelerometer.

4. The sensor package of claim 3, wherein the MEMS accelerometer is configured to acquire a one-dimensional acceleration measurement.

5. The sensor package of claim 3, wherein the MEMS accelerometer is configured to acquire a three-dimensional acceleration measurement.

6. The sensor package of claim 1, wherein the processing system is configured to:
perform a synchronization-based cross-correlation operation on the first portion of the first set of measurements and the second portion of the second set of measurements;
determine a time shift based on the synchronization-based cross-correlation operation;
apply the time shift to the first set of measurements;
adjust an amplitude to the first set of measurements based on the second set of measurements;
normalize the first portion of the first set of measurements for the first measurement range; and
combine the normalized first portion of the first set of measurements with the second portion of the second set of measurements.

7. The sensor package of claim 1, wherein the processing system is configured to:
receive a remote clock signal via a communication protocol;
determine an expected transmission delay for the remote clock signal based on the communication protocol; and
synchronize a clock based on the remote clock signal and the expected transmission delay.

8. The sensor package of claim 1, wherein the processing system is configured to:
determine whether a base station is within a distance threshold; and send the first set of measurements, the second set of measurements, the third set of measurements, or any combination thereof to an additional sensor package within the distance threshold in response to determining that the base station is outside the distance threshold.

9. The sensor package of claim 1, wherein the first set of measurements and the second set of measurements comprise acceleration data.

* * * * *